United States Patent
Hirayama et al.

(10) Patent No.: US 12,492,351 B2
(45) Date of Patent: Dec. 9, 2025

(54) WASTE TREATMENT SYSTEM AND METHOD USING ENERGY RECIRCULATION TECHNIQUES

(71) Applicant: DHF AMERICA, LLC, Raleigh, NC (US)

(72) Inventors: Kotaro Hirayama, Tokyo (JP); Isamu Umeda, Tokyo (JP)

(73) Assignee: DHF AMERICA, LLC, Raleigh, NC (US)

( * ) Notice: Subject to any disclaimer, the term of this patent is extended or adjusted under 35 U.S.C. 154(b) by 0 days.

(21) Appl. No.: 18/041,590

(22) PCT Filed: Sep. 10, 2021

(86) PCT No.: PCT/US2021/049757
§ 371 (c)(1),
(2) Date: Feb. 14, 2023

(87) PCT Pub. No.: WO2022/060631
PCT Pub. Date: Mar. 24, 2022

(65) Prior Publication Data
US 2023/0295529 A1    Sep. 21, 2023

Related U.S. Application Data

(60) Provisional application No. 63/080,181, filed on Sep. 18, 2020.

(51) Int. Cl.
*B01J 6/00* (2006.01)
*B01J 19/24* (2006.01)
(Continued)

(52) U.S. Cl.
CPC ............. *C10L 9/086* (2013.01); *B01J 6/008* (2013.01); *B01J 19/2425* (2013.01);
(Continued)

(58) Field of Classification Search
CPC ........ B01J 6/008; B01J 19/24; B01J 19/2415; B01J 19/2425; B01J 19/0013;
(Continued)

(56) References Cited

U.S. PATENT DOCUMENTS 1,968,843 A * 8/1934 Malisoff ................ C10G 19/08
48/195
3,916,807 A   11/1975 Eiki
(Continued)

FOREIGN PATENT DOCUMENTS

WO   2019233673 A1   12/2019
WO   2020263905 A1   12/2020

OTHER PUBLICATIONS

International Search Report and Written Opinion received for PCT/US2021/049757, mailed Feb. 8, 2022.
(Continued)

*Primary Examiner* — Lessanework Seifu
(74) *Attorney, Agent, or Firm* — Greer, Burns & Crain, Ltd

(57) ABSTRACT

A system of treating waste materials (28) is provided, and includes a waste treatment reactor (10) configured to treat the waste materials. The waste treatment reactor (10) has a cylindrical body (12) having an inlet (14) to receive the waste materials, a waste chamber (26) to store the waste materials, and an outlet (16) configured to deliver treated waste materials out of the waste chamber. A bundle reactor (38) has the waste treatment reactor and performs a waste treatment for the waste materials stored in the waste chamber. An energy recirculation assembly (40) is connected to the bundle reactor and recirculates thermal energy associated with the bundle reactor during the waste treatment. The energy recirculation assembly (40) has a heating unit (42) to
(Continued)

heat a first region of the bundle reactor, and a cooling unit (44) to cool a second region of the bundle reactor.

11 Claims, 13 Drawing Sheets

(51) Int. Cl.
 *C10L 5/44* (2006.01)
 *C10L 9/08* (2006.01)
(52) U.S. Cl.
 CPC ..... *C10L 5/447* (2013.01); *B01J 2219/00018* (2013.01); *B01J 2219/0009* (2013.01); *B01J 2219/00132* (2013.01); *B01J 2219/0871* (2013.01); *C10L 2200/0469* (2013.01); *C10L 2290/02* (2013.01); *C10L 2290/06* (2013.01); *C10L 2290/146* (2013.01); *C10L 2290/38* (2013.01)
(58) Field of Classification Search
 CPC ...... B01J 2219/00018; B01J 2219/0009; B01J 2219/00132; B01J 2219/1943; B01J 2219/185; B01J 2219/00101; B01J 2219/00123; B01J 2219/00128; B01J 2219/0013

See application file for complete search history.

(56) References Cited

U.S. PATENT DOCUMENTS

| | | | |
|---|---|---|---|
| 5,096,680 A | | 3/1992 | Lindbauer et al. |
| 6,878,290 B2* | | 4/2005 | Joussot-Dubien ..... B01J 19/006 |
| | | | 422/184.1 |
| 6,929,752 B2* | | 8/2005 | Cansell .................... B01J 3/042 |
| | | | 210/759 |
| 2004/0144019 A1* | | 7/2004 | Nicklin ...................... B01J 8/20 |
| | | | 44/626 |
| 2007/0257384 A1* | | 11/2007 | Sung .......................... C10J 1/24 |
| | | | 261/119.1 |
| 2008/0302725 A1 | | 12/2008 | Feng et al. |
| 2013/0041051 A1 | | 2/2013 | Zuberbuhler et al. |
| 2023/0340350 A1* | | 10/2023 | Mcrae .................... C10L 9/086 |

OTHER PUBLICATIONS

International Preliminary Report on Patentability received for PCT/US2021/049757, mailed Feb. 12, 2024.

* cited by examiner

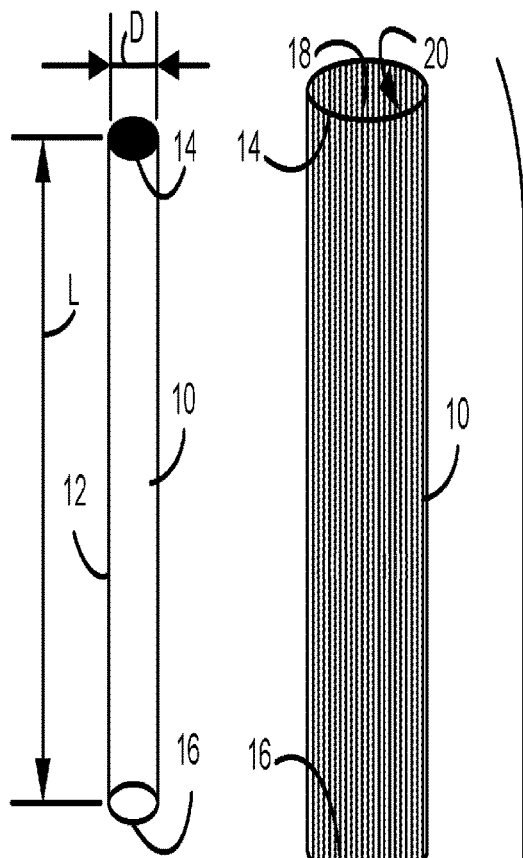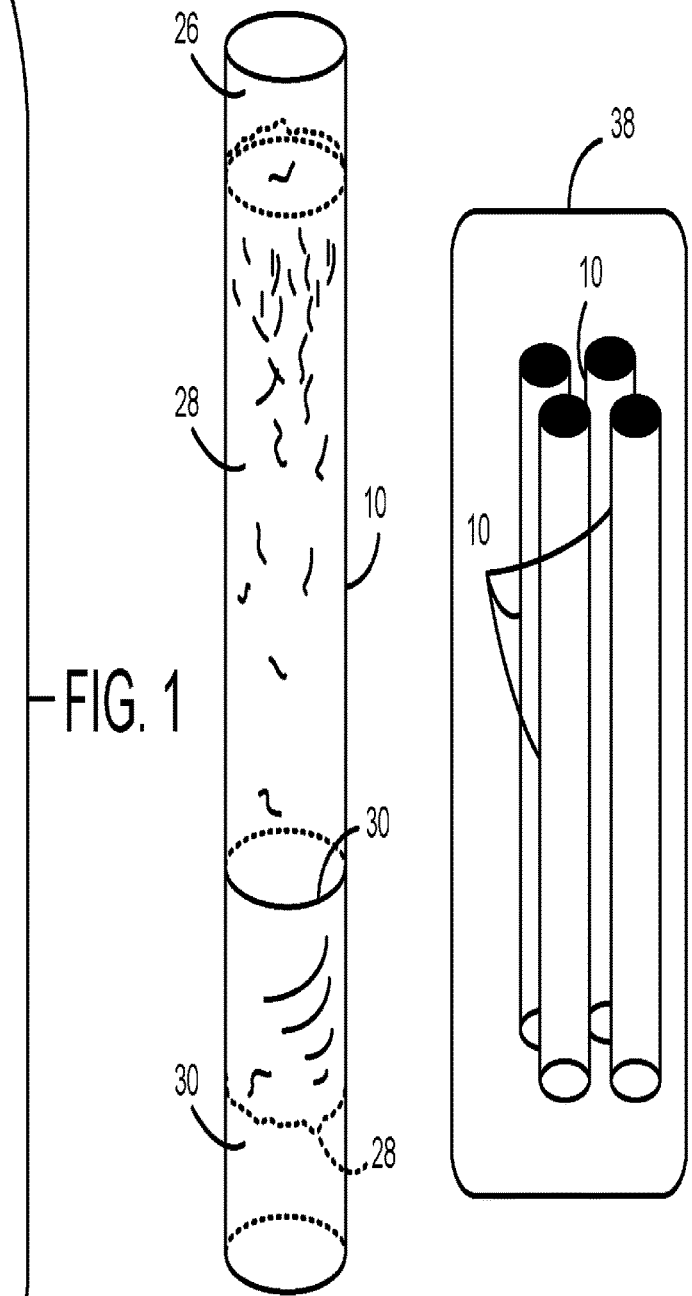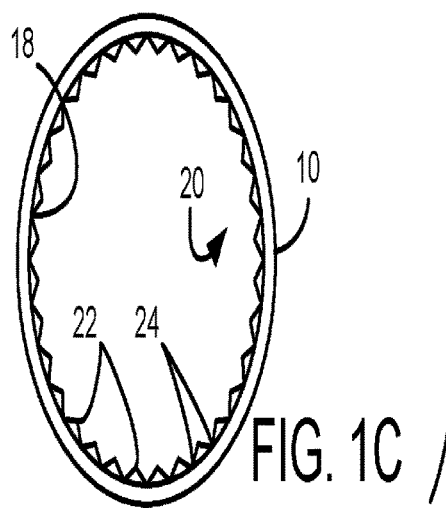
FIG. 1A  FIG. 1B  FIG. 1  FIG. 2  FIG. 4
FIG. 1C

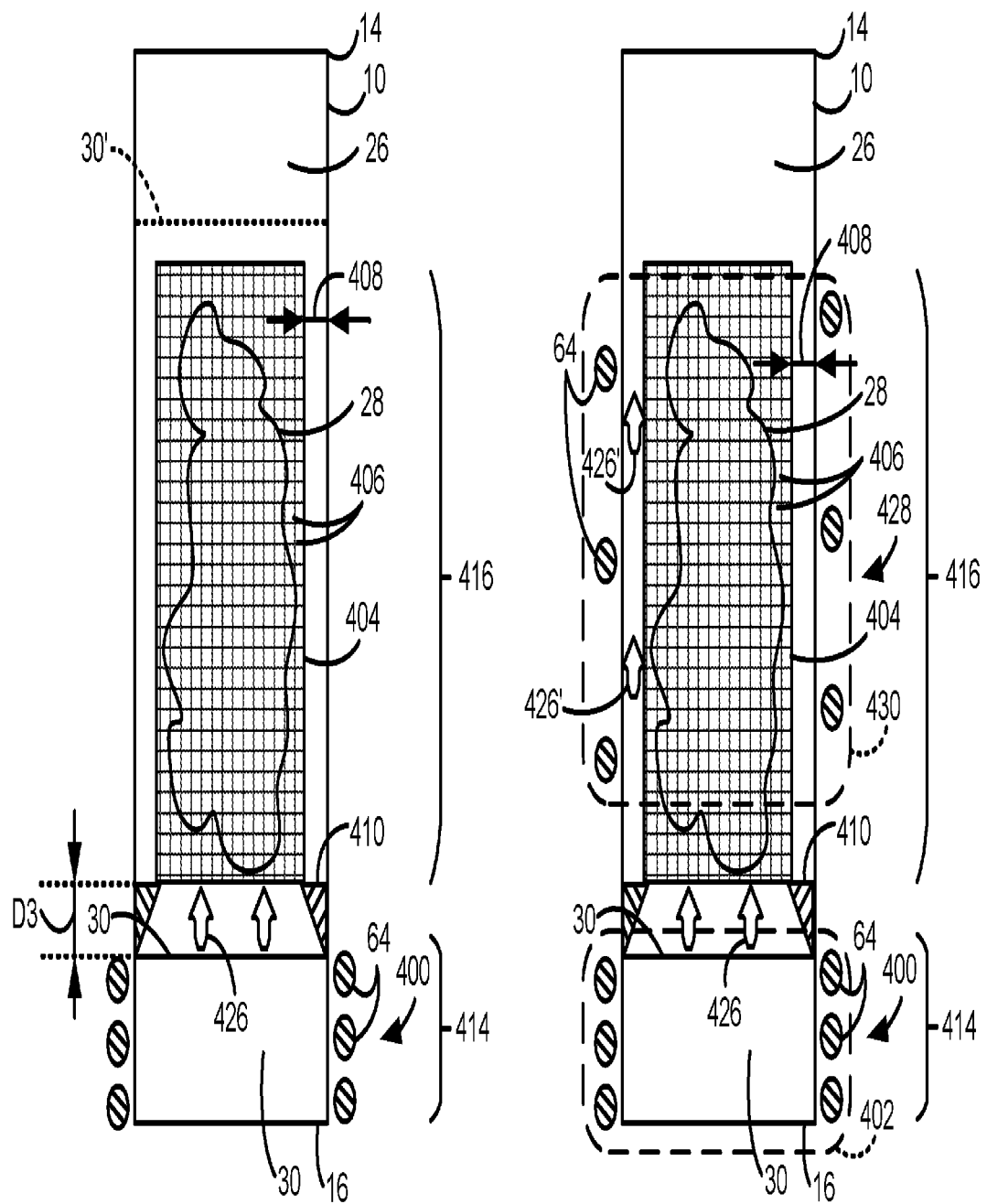

WASTE TREATMENT SYSTEM AND METHOD USING ENERGY RECIRCULATION TECHNIQUES

RELATED APPLICATIONS

The present application claims priority under 35 USC § 119 from U.S. Provisional Application No. 63/080,181, filed Sep. 18, 2020, titled "WASTE TREATMENT SYSTEM AND METHOD USING ENERGY RECIRCULATION TECHNIQUES," the contents of which are incorporated by reference herein.

BACKGROUND

The present invention relates to waste treatment systems, and more specifically relates to a waste treatment system and method for treating waste materials using energy recirculation techniques.

Recently, waste production in the world has been growing at an alarming rate, and current treatment methods of the waste materials are convoluted and energy inefficient when using existing waste treatment systems. Further, due to industrial evolution and population increase, there is much less room for landfills and the waste treatment costs have increased drastically. To enhance waste reduction, carbon recovery, and re-utilization of such waste materials during the waste treatment, various treatment systems have been developed.

For example, in Municipal Solid Waste (MSW) treatment, the existing waste treatment systems typically use large reactors requiring heavy equipment and escalated power and energy consumption for treating the MSW. Most MSW treatment techniques rely on such high energy and mechanical systems, and thus the existing MSW systems often operate at significant costs. Moreover, potential contamination of water resources and air pollution, and increased health risks caused by certain types of reactors are of growing concern.

Thus, there is a need to develop an enhanced waste treatment system for treating the waste materials that overcomes one or more above-described disadvantages of the existing waste treatment systems.

SUMMARY

In one embodiment of the present disclosure, a system of treating one or more waste materials is provided, and includes a first waste treatment reactor configured to treat the waste materials. The first waste treatment reactor has a cylindrical body having an inlet configured to receive the waste materials, a waste chamber configured to store the waste materials and an aqueous solution, and an outlet configured to deliver treated waste materials out of the waste chamber. A first bundle reactor has the first waste treatment reactor and is configured to perform a waste treatment for the waste materials stored in the waste chamber of the first waste treatment reactor. A first energy recirculation assembly is connected to the first bundle reactor and is configured to recirculate thermal energy associated with the first bundle reactor during the waste treatment. The first energy recirculation assembly has at least one of: a first heating unit configured to heat a first region of the bundle reactor, and a first cooling unit configured to cool a second region of the first bundle reactor.

In one example, the first waste treatment reactor includes a recirculation apparatus configured to facilitate circulation of vapor and liquid formed in the cylindrical body of the first waste treatment reactor.

In another example, the first heating unit is configured to heat the aqueous solution disposed in the first region of the first bundle reactor, and the first cooling unit is configured to cool the waste materials disposed in the second region of the first bundle reactor.

In yet another example, the system further includes a second bundle reactor having a second waste treatment reactor and configured to perform the waste treatment for the waste materials stored in a waste chamber of the second waste treatment reactor, and a second energy recirculation assembly connected to the second bundle reactor and configured to recirculate thermal energy associated with the second bundle reactor during the waste treatment. The second energy recirculation assembly has at least one of: a second heating unit configured to heat a first region of the second bundle reactor, and a second cooling unit configured to cool a second region of the second bundle reactor. In a variation, the first energy recirculation assembly and the second energy recirculation assembly are configured to perform thermal energy recirculation between the first bundle reactor and the second bundle reactor using at least one of: the first cooling unit, the first heating unit, the second cooling unit, and the second heating unit. In another variation, the first cooling unit is configured to apply the thermal energy associated with the first cooling unit to the treated waste materials associated with the second bundle reactor. In yet another variation, the first heating unit is configured to apply the thermal energy associated with the first heating unit to the waste materials associated with the second bundle reactor. In still another variation, the thermal energy associated with the first bundle reactor in a first waste treatment process step is applied to the waste materials associated with the second bundle reactor in a second waste treatment process step, where the first waste treatment process step is different from the second waste treatment process step. In yet still another variation, the first cooling unit is configured to apply the thermal energy associated with the first cooling unit to the second cooling unit associated with the second bundle reactor. In a further variation, the first heating unit is configured to apply the thermal energy associated with the first heating unit to the second heating unit associated with the second bundle reactor.

In another embodiment of the present disclosure, a reactor for treating one or more waste materials is provided. Included in the reactor is a cylindrical body having a first end and an opposite second end. The first end is configured to receive the waste materials for waste treatment, and the second end is configured to deliver treated waste materials from the cylindrical body. The cylindrical body has a predetermined length and diameter ratio to be operated as a heat pipe during the waste treatment. The predetermined length and diameter ratio is defined by a longitudinal length of the cylindrical body and an outer diameter of the cylindrical body, and has a predetermined value defined by a lower boundary value and an upper boundary value.

In one example, the reactor includes a heating member configured to heat a first heating region of the reactor. In a variation, the waste materials are heated using at least one of: a volumetric steam flow and a volumetric fluid flow generated by the heating member. In another variation, the reactor includes a holding member configured to hold the waste materials in the holding member. In yet another variation, the reactor includes a supporting member configured to support the holding member in a waste chamber of the reactor during the waste treatment. In still another variation, the supporting member is configured to dispose the holding member to be separated from the heating member at a predetermined distance. In yet still another variation, the reactor includes a hanging supporting member configured to allow the holding member to be suspended in the reactor during the waste treatment. In a further variation, the holding member includes a flow channel configured for facilitating a flow of an aqueous solution in the reactor.

In another example, the reactor includes a supplementary heating member configured to heat a second heating region of the reactor. In a variation, the heating member is configured to heat the first heating region to reach a first predetermined temperature, and the supplementary heating member is configured to heat the second heating region to reach a second predetermined temperature.

In yet another example, the reactor further includes a condensate insertion member configured to generate condensate in the reactor and insert the condensate into the waste materials to heat a predetermined portion of the waste materials.

In still another example, the reactor is configured to heat the waste materials using at least one of: a volumetric steam flow and a volumetric fluid flow generated in the cylindrical body.

The methods, systems, and apparatuses disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIGS. 1A, 1B, and 1C (collectively referred to as FIG. 1) illustrate schematic diagrams of an exemplary configuration of a waste treatment reactor configured for treating one or more waste materials in accordance with embodiments of the present disclosure;

FIG. 2 illustrates a schematic diagram of the waste treatment reactor of FIG. 1 when the waste materials and an aqueous solution are inserted into the waste treatment reactor for waste treatment;

FIG. 4 illustrates a schematic diagram of a bundle reactor configured for treating one or more waste materials in accordance with embodiments of the present disclosure;

FIG. 19 illustrates a side crossection detail of the waste treatment reactor of FIG. 14 treating the waste materials in the holding member using a steam flow generated by the heating member;

FIG. 20 illustrates a side crossection detail of another configuration of the waste treatment reactor of FIG. 14 featuring the heating member having an additional heating member configured to heat a second heating region of the waste treatment reactor in accordance with embodiments of the present disclosure;

Figure 5:
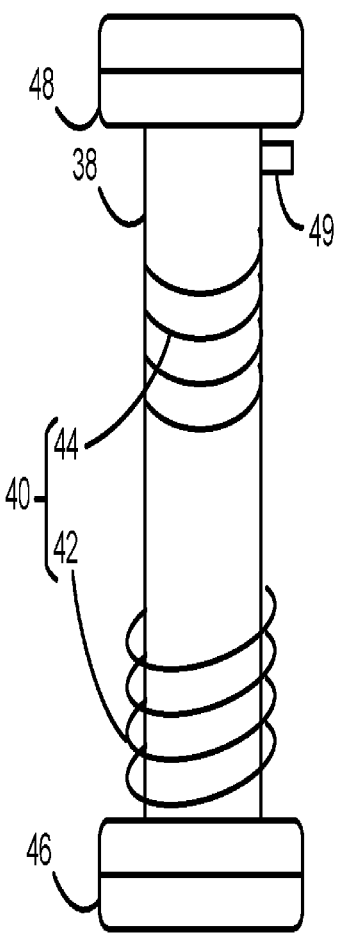
FIG. 5 illustrates a schematic diagram of the bundle reactor of FIG. 4 connected to a heating assembly in accordance with embodiments of the present disclosure.

Other features of the present embodiments will be apparent from the accompanying drawings and from the detailed description that follows.

DETAILED DESCRIPTION

Embodiments of the present disclosure will be described in detail herebelow with reference to the attached drawings.

Referring now to FIG. 1 (i.e., FIGS. 1A, 1B, and 1C), an exemplary waste treatment reactor 10 configured for treating waste materials, such as domestic sludges and solid wastes, is shown. For example, the waste materials include the MSW. In one embodiment, the waste treatment reactor 10 has a cylindrical or tubular body 12 having a first end 14 and an opposite second end 16. In one embodiment, the waste treatment reactor 10 is a line pipe made of stainless configured to be used as a kiln or reactor vessel.

In embodiments, the first end 14 has an inlet configured to receive the waste materials into the cylindrical body 12 for the waste treatment, and the second end 16 has an outlet configured to deliver the treated waste materials out of the cylindrical body 12. An exemplary configuration of the cylindrical body 12 of the waste treatment reactor 10 includes a longitudinal length L of approximately 2 meters and an outer diameter D of approximately 0.2 meter. An exemplary volume or capacity of the cylindrical body 12 is approximately 50 liters.

In one embodiment, to properly operate as the reactor vessel (e.g., a heat pipe), the waste treatment reactor 10 is specifically configured to have a predetermined length and diameter ratio R for the cylindrical body 12. An exemplary length and diameter ratio R of the cylindrical body 12 relates to a surface area ratio and can be shown below in expressions (1) and (2):

$$R = \frac{L}{D} \tag{1}$$

wherein the length and diameter ratio R of the cylindrical body 12 is defined by a value of the longitudinal length L divided by the outer diameter D. For example, the longitudinal length L can be 3 meters and the outer diameter D can be 0.2 meter. However, other suitable values for the longitudinal length L and the outer diameter D are also contemplated to suit different applications.

$$\lambda_1 \leq R \leq \lambda_2 \tag{2}$$

wherein the length and diameter ratio R is greater than or equal to a lower boundary value $\lambda_1$ (e.g., a minimum value) and less than or equal to an upper boundary value $\lambda_2$ (e.g., a maximum value).

For example, the lower boundary value $\lambda_1$ can be 10 and the upper boundary value $\lambda_2$ can be 30. However, other suitable values for the lower and upper boundary values $\lambda_1$, $\lambda_2$ are also contemplated to suit different applications. As such, to properly scale up a size of the cylindrical body 12 of the waste treatment reactor 10, the length and diameter ratio R is maintained between the lower boundary value $\lambda_1$ and the upper boundary value $\lambda_2$ without changing the value of the length and diameter ratio R.

In one embodiment, the waste treatment reactor 10 is configured to be operated as a heat pipe configured to effectively transfer heat between the first end 14 and the second end 16 during the waste treatment. In one embodiment, an inner surface 18 of the cylindrical body 12 includes a closed-loop recirculation apparatus 20 configured to facilitate circulation of vapor and liquid formed in the cylindrical body 12 during the waste treatment. In one embodiment, the inner surface 18 of the cylindrical body 12 is welded by overlay welding.

For example, the recirculation apparatus 20 includes a plurality of longitudinal protrusions 22, made of nickel-based powder overlay or powder-added material, extending from the inner surface 18 of the cylindrical body 12 between the first end 14 and the second end 16. In this configuration, after the vapor condenses on the inner surface 18 of the cylindrical body 12, the condensate can travel or flow along a plurality of inner grooves 24 formed by the protrusions 22 between the first end 14 and the second end 16 under the action of gravity or capillary force.

Referring now to FIG. 2, the waste treatment reactor 10 includes a waste chamber 26 configured to hold or store one or more waste materials 28, such as the MSW, and an aqueous solution 30, such as water, mixed together as a waste sludge or slurry. In embodiments, a mixture of the waste materials 28 and the aqueous solution 30 is inserted into the waste chamber 26 of the waste treatment reactor 10.

In one embodiment, an exemplary weight ratio of water to MSW is approximately one to one (1:1). For example, the MSW is approximately 12.5 kilogram (kg) and the water is approximately 12.5 liter (L), wherein the MSW includes organic waste materials without metals and the water is at between approximately 70-80 degrees Celsius (° C.). An exemplary bulk density of the MSW is approximately 4.09 liter per kilogram (L/kg).

Figure 3:
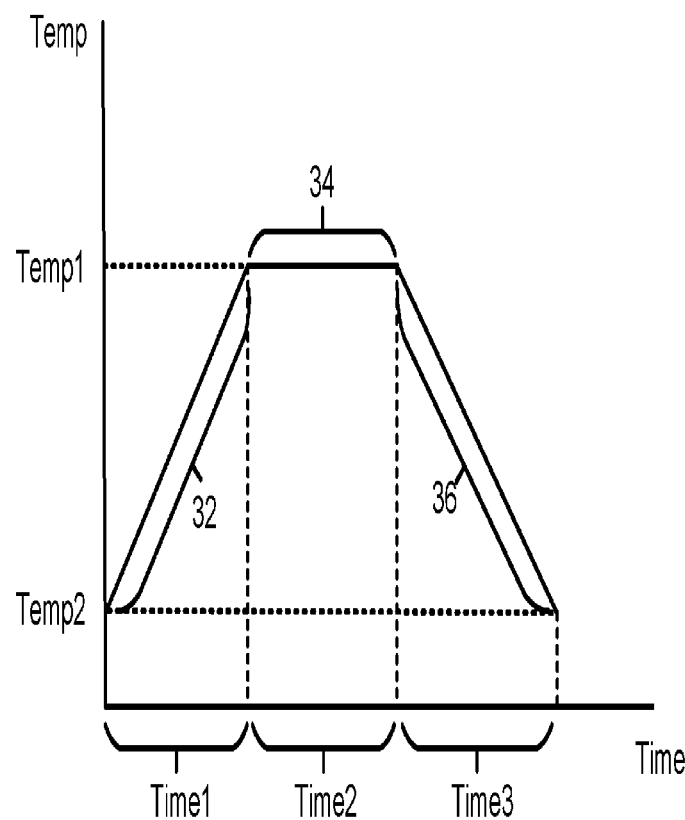
FIG. 3 illustrates an exemplary graphical presentation of a relationship between a temperature of the aqueous solution and a time of the waste materials in the waste treatment reactor of FIG. 2 during the waste treatment.

Referring now to FIG. 3, an exemplary relationship is shown between a temperature Temp of the aqueous solution 30 and a time Time of the waste materials 28 in the waste treatment reactor 10 during the waste treatment. In FIG. 3, an X-axis represents the time Time of the waste materials 28 in the waste treatment reactor 10, and a Y-axis represents the temperature Temp of the aqueous solution 30 during the waste treatment.

In one embodiment, as shown in a first line segment 32, the waste materials 28 in the waste treatment reactor 10 is initially heated for a first predetermined time period Time1 to reach a first predetermined temperature Temp1, which is referred to as a heat process step of the waste treatment. An exemplary first predetermined temperature Temp1 ranges approximately between 100-350° C.

For example, the first predetermined time period Time1 is approximately 10 minutes, and the first predetermined temperature Temp1 is approximately 280° C. As such, in one embodiment, subcritical water is used for performing the waste treatment. Heating methods include any conventional heating techniques, such as induction or electric heating methods.

Upon completion of the heat process step, as shown in a second line segment 34 referred to as a residence time, a current temperature of the waste materials 28 in the waste treatment reactor 10 is maintained approximately at the first predetermined temperature Temp1 for a second predetermined time period Time2, which is referred to as a keep process step of the waste treatment. For example, the residence time defined by the second predetermined time period Time2 is approximately 10 minutes.

Upon completion of the keep process step, as shown in a third line segment 36, the waste materials 28 in the waste treatment reactor 10 is cooled for a third predetermined time period Time3 to reach a second predetermined temperature Temp2, which is referred to as a cool process step of the waste treatment. For example, the third predetermined time period Time3 is approximately 10 minutes, and the second predetermined temperature Temp2 ranges approximately between 70-100° C.

In the illustrated embodiment, all of the heat, keep, and cool process steps of the waste treatment take merely about 30 minutes to complete a necessary chemical reaction of the waste materials 28 in the waste treatment reactor 10 for converting the waste materials 28 into value-added recycled materials. For example, using the waste treatment reactor 10, hydrothermal carbonization (HTC) can be performed to convert the MSW into sterilized coal-like product, such as hydrochar or biochar, characterized by high carbon content and high calorific value.

Referring now to FIG. 4, a bundle reactor 38 is shown that is configured to treat one or more waste materials 28 in accordance with embodiments of the present disclosure. In one embodiment, the bundle reactor 38 includes one or more waste treatment reactors 10 to simultaneously perform the waste treatment for the waste materials 28 in each waste treatment reactor 10. A dispersion-type reactor, such as the bundle reactor 38, can be used to enhance the thermal response of the waste materials 28 during the waste treatment.

In FIG. 4, because four waste treatment reactors 10 are used, an exemplary volume or capacity of the bundle reactor 38 is approximately 200 liters. Although four waste treatment reactors 10 are shown for illustration purposes, any number of waste treatment reactors 10 can be included in the bundle reactor 38 to suit different applications. For example, the bundle reactor 38 can include a single waste treatment reactor 10, or two or more waste treatment reactors 10 depending on a desired configuration.

Referring now to FIG. 5, in one embodiment, the bundle reactor 38 is the single waste treatment reactor 10 and is connected to an energy recirculation assembly 40 configured to recirculate thermal energy associated with the bundle reactor 38. In one embodiment, the energy recirculation assembly 40 includes a heating unit 42 configured to heat a first region of the bundle reactor 38, and a cooling unit 44 configured to cool a second region of the bundle reactor 38.

For example, to induce the chemical reaction of the waste materials 28, the heating unit 42 is configured to inductively heat the aqueous solution 30 disposed in a lower portion of the bundle reactor 38 to the first predetermined temperature Temp1 during the heat process step of the waste treatment. In one embodiment, the heating unit 42 is made of a continuous pipe configured to surround an outer surface of the lower portion of the bundle reactor 38.

Conversely, the cooling unit 44 is configured to cool the waste materials 28 disposed in an upper portion of the bundle reactor 38 to the second predetermined temperature Temp2 during the cool process step of the waste treatment. In one embodiment, the cooling unit 44 is made of a continuous pipe configured to surround an outer surface of the upper portion of the bundle reactor 38.

Referring now to FIGS. 2 and 4-5, in one embodiment, the bundle reactor 38 is fluidically connected at one end to a first connector 46 configured to deliver the waste materials 28 from the waste chamber 26 (FIG. 2), and also fluidically connected at an opposite end to a second connector 48 configured to receive the waste materials 28 into the waste chamber 26. For example, additional conduits or other suitable parts can be connected using the first connector 46 and/or the second connector 48 for transferring the waste materials 28 into and out of the waste chamber 26.

In one embodiment, an escape valve 49 is connected to the bundle reactor 38 and configured to relieve an inner pressure built in the waste chamber 26 of each waste treatment reactor 10 of the bundle reactor 38. For example, an oxygen gas trapped in the waste chamber 26 of each waste treatment reactor 10 can escape through the escape valve 49 during the heat process step of the waste treatment. As the vapor formed in the waste chamber 26 evaporates through the escape valve 49, the oxygen gas is pushed out of the waste chamber 26 by the vapor. Consequently, mainly carbonized waste materials and water remain in the waste treatment reactor 10.

Figure 6:
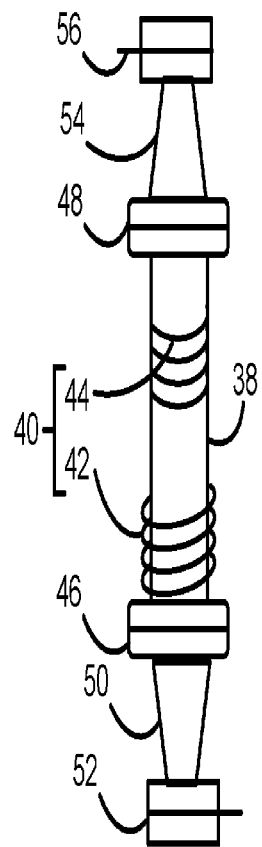
FIG. 6 illustrates a schematic diagram of the bundle reactor of FIG. 5 connected to gate valves in accordance with embodiments of the present disclosure.

Referring now to FIG. 6, in one embodiment, the first connector 46 is fluidically connected to a first reducer 50 configured to permit a flow of the waste materials 28, and the first reducer 50 is fluidically connected to a first gate valve 52 configured to stop or start a flow of the waste materials 28. Although the first gate valve 52 functions in pipelines as an isolating valve, other suitable valves, such as control or regulating valves, are also contemplated to suit the application.

Similarly, the second connector 48 is fluidically connected to a second reducer 54 configured to permit the flow of the waste materials 28, and the second reducer 54 is fluidically connected to a second gate valve 56 configured to stop or start the flow of the waste materials 28. Other suitable attachments, such as additional conduits, manifolds, or pipes, can also be connected to suit different applications. For example, a 4-way manifold can be used to fluidically connect four waste treatment reactors 10 of the bundle reactor 38 to the first reducer 50.

Figure 7:
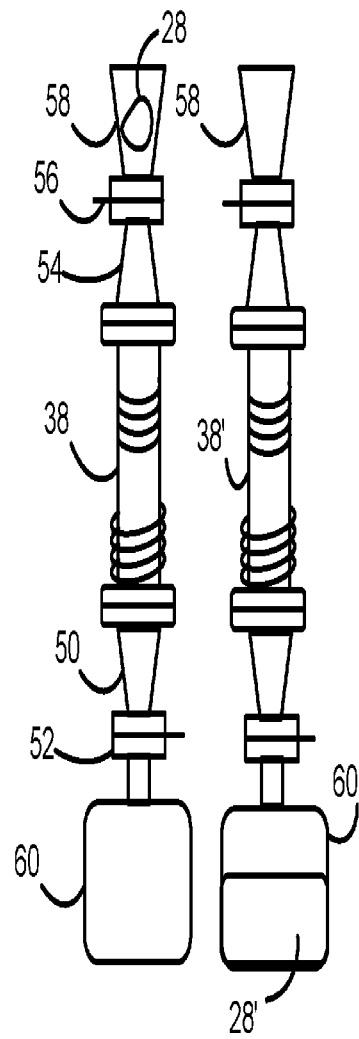
FIG. 7 illustrates a schematic diagram of the bundle reactor of FIG. 6 operating with another bundle reactor as a continuous waste treatment system in accordance with embodiments of the present disclosure.

Referring now to FIG. 7, the bundle reactor 38 is operating in tandem with another bundle reactor 38' as a continuous waste treatment system in accordance with embodiments of the present disclosure. In one embodiment, the second gate valve 56 is fluidically connected to a hopper 58 configured to receive the waste materials 28.

At an opposite end, the first gate valve 52 is fluidically connected to a holding tank 60 configured to hold treated waste materials 28', such as a biochar, biogas, biofuel, and the like, upon completion of at least one of: the heat, keep, and cool process steps of the waste treatment. Additional process steps of the waste treatment, such as dehydrating and drying the treated waste materials 28', can be performed for further treatment. Detailed descriptions of the additional process steps are provided below in paragraphs relating to FIGS. 9-13.

Figure 8:
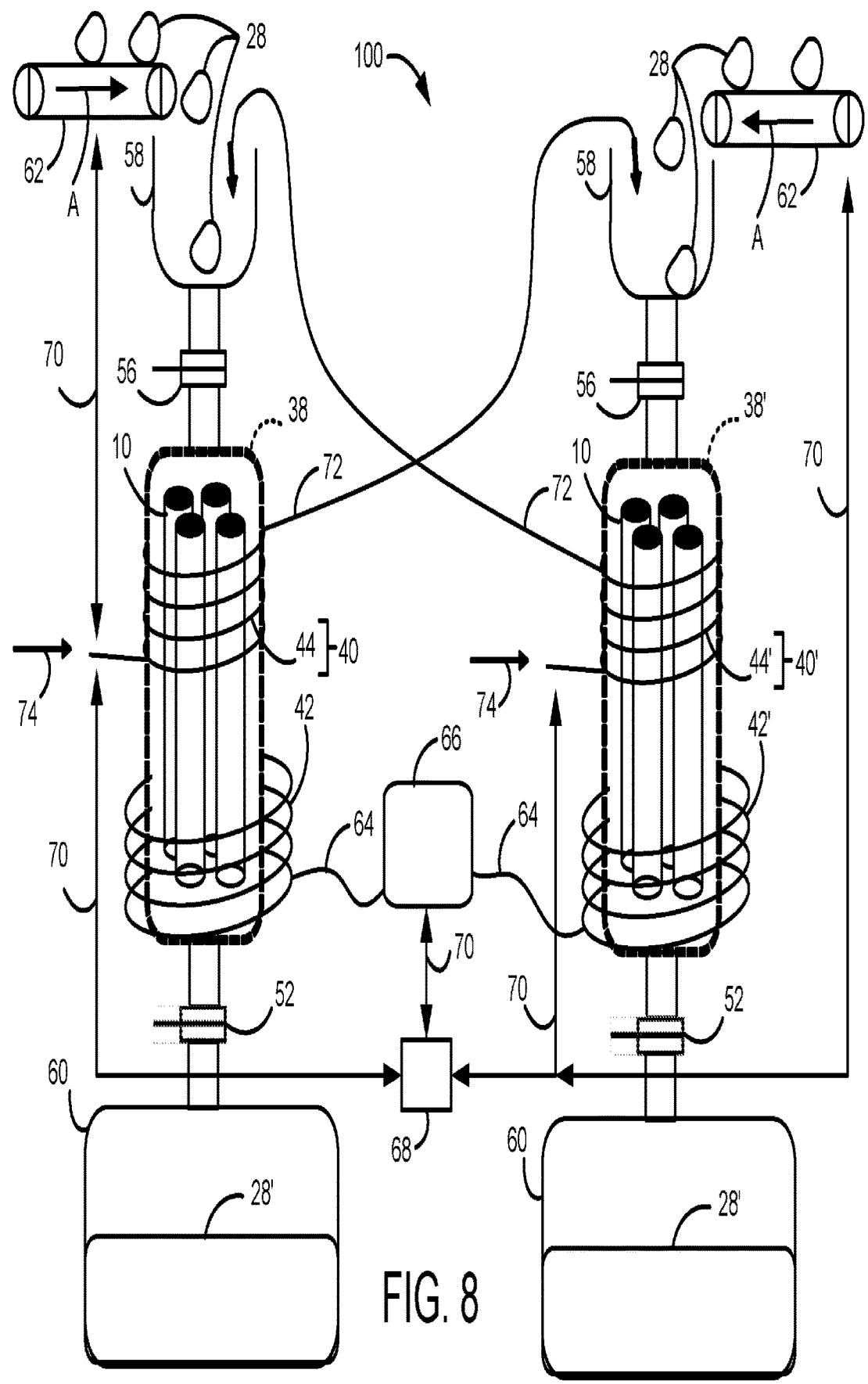
FIG. 8 illustrates a schematic diagram of an exemplary waste treatment system using a pair of bundle reactors of FIG. 4 in accordance with embodiments of the present disclosure.

Referring now to FIG. 8, an exemplary waste treatment system 100 using a pair of bundle reactors 38 and 38' is shown. In the illustrated embodiment, the pair of bundle reactors 38 and 38' are used to recirculate the thermal energy associated with each bundle reactor 38, 38' during the waste treatment. In one embodiment, a delivery system 62, such as a conveyor device, is used to deliver the waste materials 28 into the hopper 58, and configured to serially advance the waste materials 28 in flow directions designated by arrows A.

In FIG. 8, a first bundle reactor 38 is connected to a first energy recirculation assembly 40 configured to recirculate the thermal energy associated with the first bundle reactor 38. Similarly, a second bundle reactor 38' is connected to a second energy recirculation assembly 40' configured to recirculate the thermal energy associated with the second bundle reactor 38'. In this configuration, the first energy recirculation assembly 40 includes the cooling unit 44 of the first bundle reactor 38, and the second energy recirculation assembly 40' includes the cooling unit 44' of the second bundle reactor 38'.

In one embodiment, the heating unit 42 includes one or more heating induction coils 64 configured to surround at least a portion (e.g., a lower region) of the first bundle reactor 38, and connected to a high-frequency power supply unit 66 configured to inductively drive the heating induction coils 64. Also, the heating unit 42' includes one or more heating induction coils 64 configured to surround at least a portion (e.g., a lower region) of the second bundle reactor 38', and connected to the high-frequency power supply unit 66.

In one embodiment, the high-frequency power supply unit 66 generates and passes a high-frequency current enough to increase the temperature of the first and second bundle reactors 38, 38' to the first predetermined temperature Temp1. During the waste treatment, the mixture of the waste materials 28 and the aqueous solution 30 is treated using the heating induction coils 64, and the treated waste materials 28' are delivered to the holding tank 60.

An exemplary energization frequency of the high-frequency power supply unit 66 can be approximately 20 kilohertz (KHz) and a maximum output can be approximately 270 kilowatts (KW). In one embodiment, the energization frequency of the high-frequency power supply unit 66 ranges between 100 KW and 120 KW. However, the frequency and the maximum output of the high-frequency power supply unit 66 can vary to suit different applications.

In the illustrated embodiment, a control system 68 is communicably connected to the high-frequency power supply unit 66 via a communication link 70. In certain embodiments, the communication link 70 can include a wired and/or wireless data transmission interface. In one embodiment, the control system 68 is configured to be communicably connected to various parts of the waste treatment system 100, such as the delivery system 62 and the energy recirculation assembly 40, via the communication link 70 to control operations of the waste treatment system 100 during the waste treatment.

In one embodiment, the control system 68 includes computer readable program instructions stored in one of memories of electronic controllers in the control system 68 and executed by a respective processor of the electronic controllers, or other computer usable medium. In another embodiment, the control system 68 includes a module or controller, which may or may not be independent from one of the electronic controllers of the waste treatment system 100.

In one embodiment, the control system 68 commands or instructs relevant valves (e.g., the first gate valve 52 and the second gate valve 56) to appropriately actuate corresponding valves, such that an appropriate inner pressure of the first and second bundle reactors 38, 38' can be maintained during operation. Other suitable automated operations of the waste treatment system 1100 are achieved by the control system 68.

In one embodiment, the control system 68 is communicably connected to the high-frequency power supply unit 66 via the communication link 70. In one embodiment, the control system 68 includes computer readable program instructions stored in one of memories of electronic controllers in the control system 68 and executed by a respective processor of the electronic controllers, or other computer usable medium.

In another embodiment, the control system 68 includes a module or controller, which may or may not be independent from one of the electronic controllers of the waste treatment system 100. For example, the control system 68 can be a programmable logic controller (PLC) or programmable controller.

In one embodiment, the control system 68 automatically controls the opening and closing operations of the first gate valve 52 and/or the second gate valve 56 by instructing the respective valve 52, 56 using the computer readable program instructions. In another embodiment, the control system 68 automatically controls the start and stop operations of the delivery system 62 by instructing the delivery system 62 using the computer readable program instructions. Other suitable operations, such as measuring current temperatures of the waste treatment reactors 10 in the corresponding bundle reactor 38, 38', are also contemplated to suit the application.

In one embodiment, the cooling unit 44 includes one or more cooling pipes 72 configured to surround at least a portion (e.g., an upper region) of the first bundle reactor 38, and configured to deliver a cooling agent 74 into the hopper 58. Also, the cooling unit 44' includes one or more cooling pipes 72 configured to surround at least a portion (e.g., an upper region) of the second bundle reactor 38', and configured to deliver the cooling agent 74 into the hopper 58.

For example, the cooling agent 74, such as water, is inserted into one end of the cooling pipe 72 of the cooling unit 44 associated with the first bundle reactor 38 to cool the upper region of the first bundle reactor 38. While cooling the upper region of the first bundle reactor 38, the cooling agent 74 is heated in the cooling pipe 72. From the other opposite end of the cooling pipe 72 of the cooling unit 44, the heated cooling agent 74 is delivered into the hopper 58 associated with the second bundle reactor 38' to be mixed with the waste materials 28 before entering the waste treatment reactors 10 of the second bundle reactor 38'.

Conversely, the cooling agent 74 is inserted into one end of the cooling pipe 72 of the cooling unit 44' associated with the second bundle reactor 38' to cool the upper region of the second bundle reactor 38'. While cooling the upper region of the second bundle reactor 38', the cooling agent 74 is heated in the cooling pipe 72. From the other opposite end of the cooling pipe 72 of the cooling unit 44', the heated cooling agent 74 is delivered into the hopper 58 associated with the first bundle reactor 38 to be mixed with the waste materials 28 before entering the waste treatment reactors 10 of the first bundle reactor 38.

As such, the first energy recirculation assembly 40 and the second energy recirculation assembly 40' can perform thermal energy recirculation between the first bundle reactor 38 and the second bundle reactor 38' using the respective cooling units 44 and 44'. Similarly, the thermal energy recirculation can also be performed using the thermal energy associated with the respective heating units 42 and 42'. Additional descriptions of thermal energy recirculation techniques are provided below in paragraphs relating to FIGS. 9-13.

Figure 9:
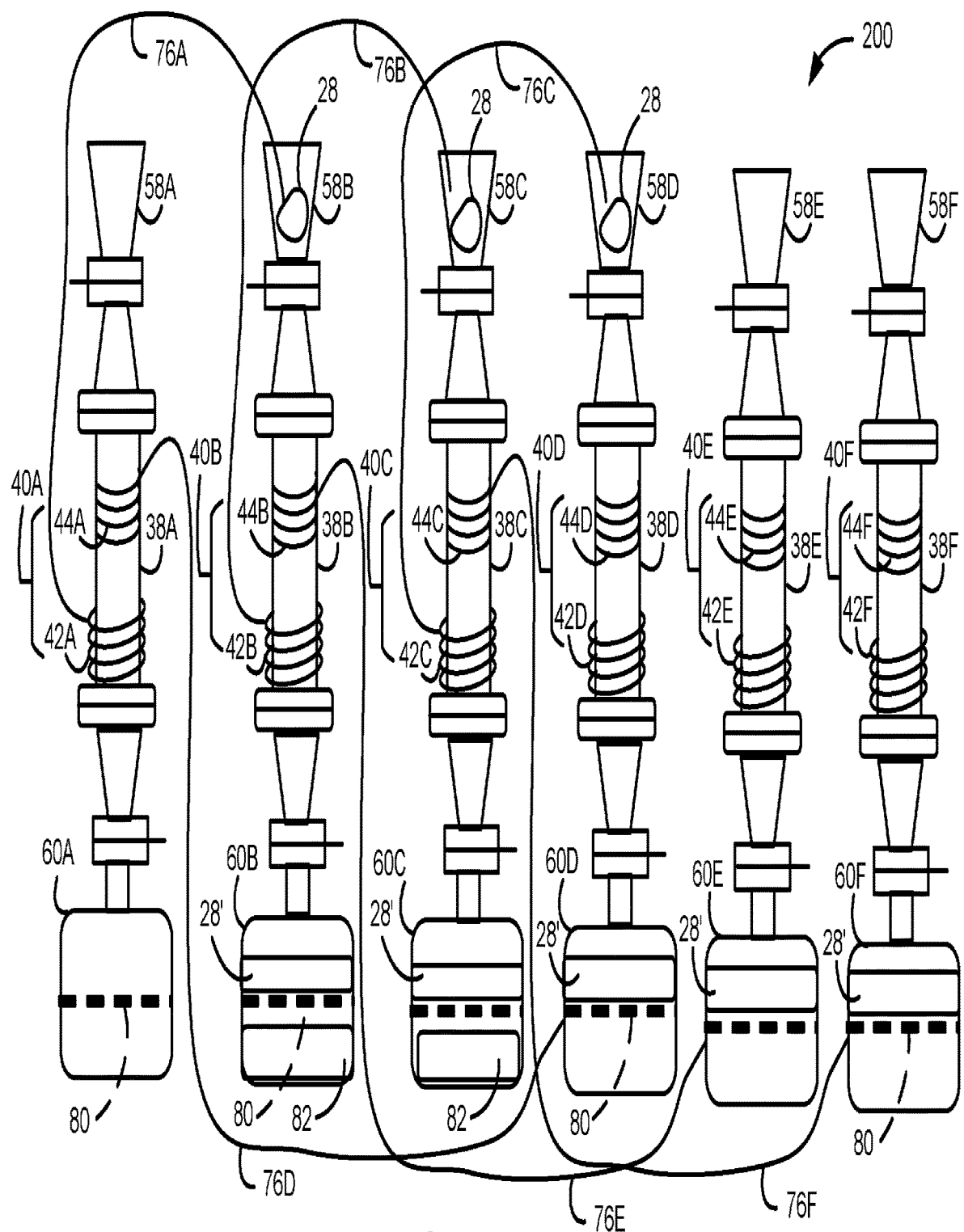
FIG. 9 illustrates a schematic diagram of another exemplary waste treatment system using a plurality of the bundle reactors of FIG. 6 in accordance with embodiments of the present disclosure.

Referring now to FIG. 9, another exemplary waste treatment system 200 using a plurality of the bundle reactors 38A-38F is shown in accordance with embodiments of the present disclosure. Although six bundle reactors 38A-38F are shown for illustration purposes, any number of bundle rectors can be implemented to suit the application. In the illustrated embodiment, it is advantageous that the plurality of the bundle reactors 38A-38F are configured to share and recirculate the thermal energy between the bundle reactors, such that improvements in energy efficiency are achieved during the waste treatment.

In this configuration, a first bundle reactor 38A is connected to a first energy recirculation assembly 40A, having a first heating unit 42A and a first cooling unit 44A, configured to recirculate the thermal energy associated with the first bundle reactor 38A. Differently from FIG. 8, the first energy recirculation assembly 40A includes both of the first cooling unit 44A and the first heating unit 42A of the first bundle reactor 38A. Similar configurations follow suit for the other bundle reactors 38B-38F. A first hopper 58A is at one end fluidically connected to the first bundle reactor 38A, and at an opposite end, a first holding tank 60A is fluidically connected to the first bundle reactor 38A.

Similarly, a second bundle reactor 38B is connected to a second energy recirculation assembly 40B, having a second heating unit 42B and a second cooling unit 44B, configured to recirculate the thermal energy associated with the second bundle reactor 38B. A second hopper 58B is at one end fluidically connected to the second bundle reactor 38B, and at an opposite end, a second holding tank 60B is fluidically connected to the second bundle reactor 38B.

A third bundle reactor 38C is connected to a third energy recirculation assembly 40C, having a third heating unit 42C and a third cooling unit 44C, configured to recirculate the thermal energy associated with the third bundle reactor 38C. A third hopper 58C is at one end fluidically connected to the third bundle reactor 38C, and at an opposite end, a third holding tank 60C is fluidically connected to the third bundle reactor 38C.

A fourth bundle reactor 38D is connected to a fourth energy recirculation assembly 40D, having a fourth heating unit 42D and a fourth cooling unit 44D, configured to recirculate the thermal energy associated with the fourth bundle reactor 38D. A fourth hopper 58D is at one end fluidically connected to the fourth bundle reactor 38D, and at an opposite end, a fourth holding tank 60D is fluidically connected to the fourth bundle reactor 38D.

A fifth bundle reactor 38E is connected to a fifth energy recirculation assembly 40E, having a fifth heating unit 42E and a fifth cooling unit 44E, configured to recirculate the thermal energy associated with the fifth bundle reactor 38C. A fifth hopper 58E is at one end fluidically connected to the fifth bundle reactor 38E, and at an opposite end, a fifth holding tank 60E is fluidically connected to the fifth bundle reactor 38E.

A sixth bundle reactor 38F is connected to a sixth energy recirculation assembly 40F, having a sixth heating unit 42F and a sixth cooling unit 44F, configured to recirculate the thermal energy associated with the sixth bundle reactor 38F. A sixth hopper 58F is at one end fluidically connected to the sixth bundle reactor 38F, and at an opposite end, a sixth holding tank 60F is fluidically connected to the sixth bundle reactor 38F.

Specifically, the first energy recirculation assembly 40A can perform the thermal energy recirculation between the first bundle reactor 38A and the second bundle reactor 38B using the first heating unit 42A. More specifically, the thermal energy associated with the first heating unit 42A is applied to the waste materials 28 in the second hopper 58B for pre-heating before entering the second bundle reactor 38B. An exemplary pre-heating temperature is approximately 70-80° C.

A first energy transfer medium 76A is used to achieve the thermal energy recirculation and configured to allow the thermal energy associated with the first heating unit 42A to be transferred to the waste materials 28 in the second hopper 58B. An exemplary energy transfer medium used with the first heating unit 42A includes fluidic matter, such as water, being deliverable by a conduit (not shown).

As another example, the second energy recirculation assembly 40B can perform the thermal energy recirculation between the second bundle reactor 38B and the third bundle reactor 38C using the second heating unit 42B. More specifically, the thermal energy associated with the second heating unit 42B is applied to the waste materials 28 in the third hopper 58C for pre-heating before entering the third bundle reactor 38C. A second energy transfer medium 76B is used to achieve the thermal energy recirculation and configured to allow the thermal energy associated with the second heating unit 42B to be transferred to the waste materials 28 in the third hopper 58C.

As yet another example, the third energy recirculation assembly 40C can perform the thermal energy recirculation between the third bundle reactor 38C and the fourth bundle reactor 38D using the third heating unit 42C. More specifically, the thermal energy associated with the third heating unit 42C is applied to the waste materials 28 in the fourth hopper 58D for pre-heating before entering the fourth bundle reactor 38D. A third energy transfer medium 76C is used to achieve the thermal energy recirculation and configured to allow the thermal energy associated with the third heating unit 42C to be transferred to the waste materials 28 in the fourth hopper 58D.

Further, the first energy recirculation assembly 40A can perform the thermal energy recirculation between the first bundle reactor 38A and the fourth bundle reactor 38D using the first cooling unit 44A. More specifically, the thermal energy associated with the first cooling unit 44A is applied to the treated waste materials 28' in the fourth holding tank 60D for dehydrating or drying the treated waste materials 28'. An exemplary dehydrating or drying temperature is approximately 100-200° C.

A fourth energy transfer medium 76D is used to achieve the thermal energy recirculation and configured to allow the thermal energy associated with the first cooling unit 44A to be transferred to the treated waste materials 28' in the fourth holding tank 60D. An exemplary energy transfer medium includes another fluidic matter, such as ambient air, being deliverable by a conduit (not shown).

As another example, the second energy recirculation assembly 40B can perform the thermal energy recirculation between the second bundle reactor 38B and the fifth bundle reactor 38E using the second cooling unit 44B. More specifically, the thermal energy associated with the second cooling unit 44B is applied to the treated waste materials 28' in the fifth holding tank 60E for dehydrating or drying the treated waste materials 28'. A fifth energy transfer medium 76E is used to achieve the thermal energy recirculation and configured to allow the thermal energy associated with the second cooling unit 44B to be transferred to the treated waste materials 28' in the fifth holding tank 60E.

As yet another example, the third energy recirculation assembly 40C can perform the thermal energy recirculation between the third bundle reactor 38C and the sixth bundle reactor 38F using the third cooling unit 44C. More specifically, the thermal energy associated with the third cooling unit 44C is applied to the treated waste materials 28' in the sixth holding tank 60F for dehydrating or drying the treated waste materials 28'. A sixth energy transfer medium 76F is used to achieve the thermal energy recirculation and configured to allow the thermal energy associated with the third cooling unit 44C to be transferred to the treated waste materials 28' in the sixth holding tank 60F.

Figure 10:
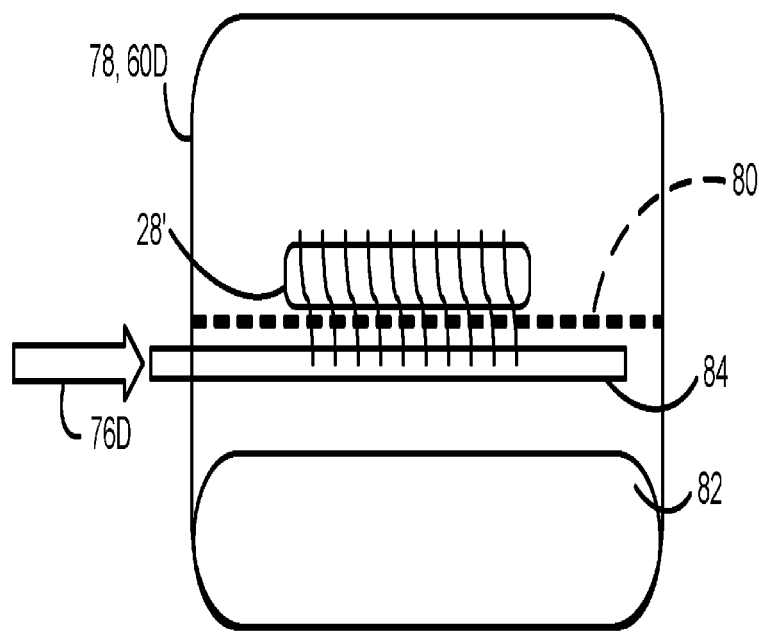
FIG. 10 illustrates a schematic diagram of an exemplary dehydration and dry vessel configured to be used with the waste treatment system of FIG. 9.

Referring now to FIG. 10, an exemplary configuration of a dehydration and dry vessel 78 configured to perform a dehydrate process step and/or a dry process step of the waste treatment is shown. For example, the dehydration and dry vessel 78 can be the fourth holding tank 60D. In one embodiment, the dehydrate process step refers to a process of dehydrating the treated waste materials 28' to have a total liquid content of less than a predetermined percentage relative to an overall weight of the treated waste materials 28' (i.e., weight %).

An exemplary predetermined percentage of the total liquid content in the treated waste materials 28' is approximately 5-30% for the dehydrate process step, but other suitable percentages are also contemplated to suit different applications. For example, a mesh filter 80 configured to filter out liquids 82, such as water, under the action of gravity is used to dehydrate the treated waste materials 28' until the total liquid content is less than 30 weight %.

In one embodiment, the dry process step refers to a process of drying the treated waste materials 28' to have a total liquid content of less than a predetermined percentage relative to an overall weight of the treated waste materials 28' (i.e., weight %). An exemplary predetermined percentage of the total liquid content in the treated waste materials 28' is approximately 0-5% for the dry process step, but other suitable percentages are also contemplated to suit different applications.

For example, an energy transfer member 84, such as a pipe, tube, channel, jacket, and the like, configured to emit the thermal energy transferred from the bundle reactor 38 is used to dehydrate the treated waste materials 28' until the total liquid content is less than 5 weight %. In FIG. 10, as an example only, the fourth energy transfer medium 76D is used to allow the thermal energy associated with the first cooling unit 44A (FIG. 9) to be transferred to the energy transfer member 84 so that the treated waste materials 28' in the dehydration and dry vessel 60D is dried.

Figure 11:
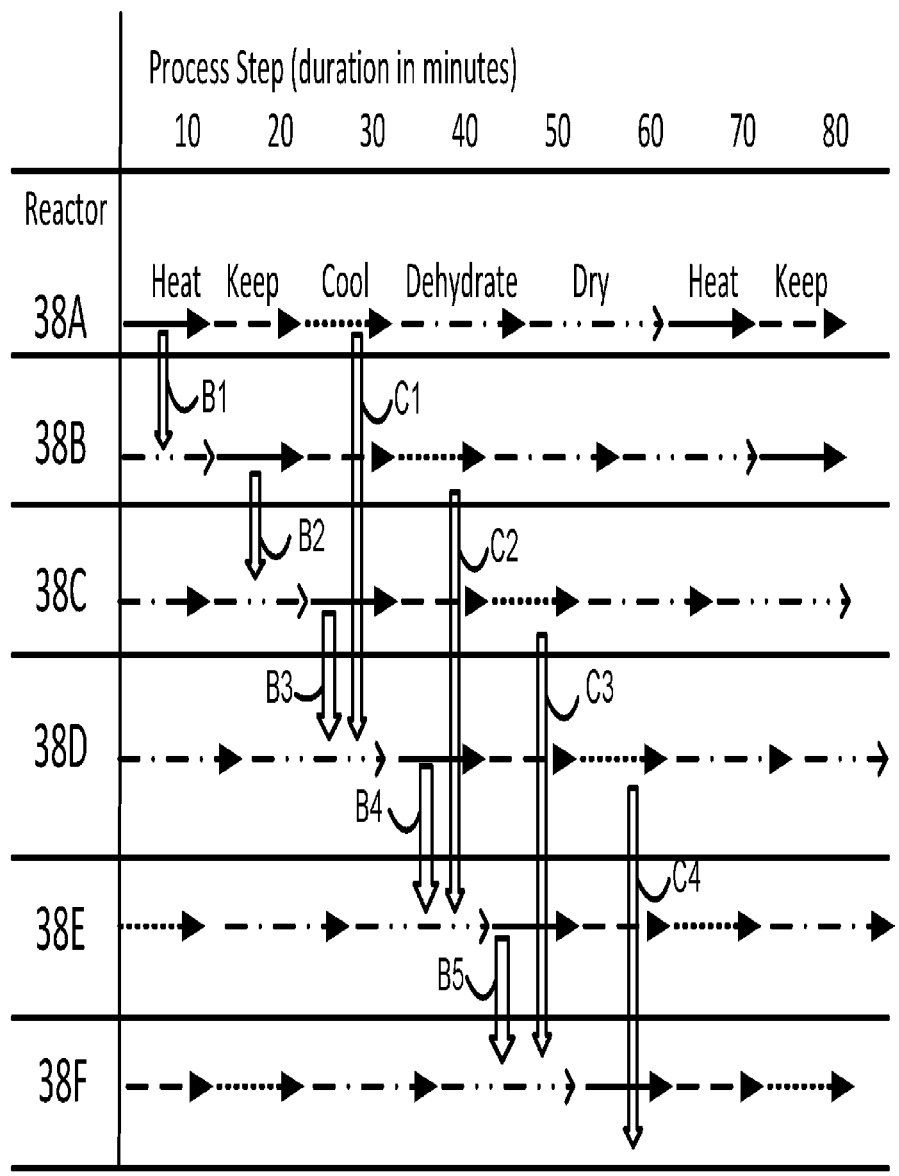
FIG. 11 illustrates an exemplary graphical presentation of a relationship between each of the bundle reactors of the waste treatment system of FIG. 9 and an exemplary waste treatment process step associated with each bundle reactor during the waste treatment.

Referring now to FIG. 11, an exemplary relationship is shown between each of the bundle reactors 38A-38F of the waste treatment system 200 and each of the waste treatment process steps associated with each bundle reactor during the waste treatment. An exemplary duration of each process step of the waste treatment is approximately 10 minutes.

In this arrangement, initially, the first bundle reactor 38A is performing the heat process step, the second bundle reactor 38B is performing the dry process step, the third bundle reactor 38C is performing the dehydrate process step, the fourth bundle reactor 38D is also performing the dehydrate process step, the fifth bundle reactor 38E is performing the cool process step, and the six bundle reactor 38F is performing the keep process step of the waste treatment. Other suitable initial process steps are also contemplated to suit the application.

As designated by an arrow B1, the thermal energy associated with the first bundle reactor 38A in the heat process step is applied to the waste materials 28 in the second hopper 58B of the second bundle reactor 38B for pre-heating before entering the second bundle reactor 38B. As designated by an arrow B2, the thermal energy associated with the second bundle reactor 38B in the heat process step is applied to the waste materials 28 in the third hopper 58C of the third bundle reactor 38C for pre-heating before entering the third bundle reactor 38C. In a similar manner, arrows B3, B4, and B5 represent the thermal energy recirculation techniques that can be implemented between relevant bundle reactors.

As designated by an arrow C1, the thermal energy associated with the first bundle reactor 38A in the cool process step is applied to the treated waste materials 28' in the fourth holding tank 60D of the fourth bundle reactor 38D for drying the treated waste materials 28'. As designated by an arrow C2, the thermal energy associated with the second bundle reactor 38B in the cool process step is applied to the treated waste materials 28' in the fifth holding tank 60E of the fifth bundle reactor 38E for drying the treated waste materials 28'. In a similar manner, arrows C3 and C4 represent the thermal energy recirculation techniques that can be implemented between relevant bundle reactors.

Figure 12:
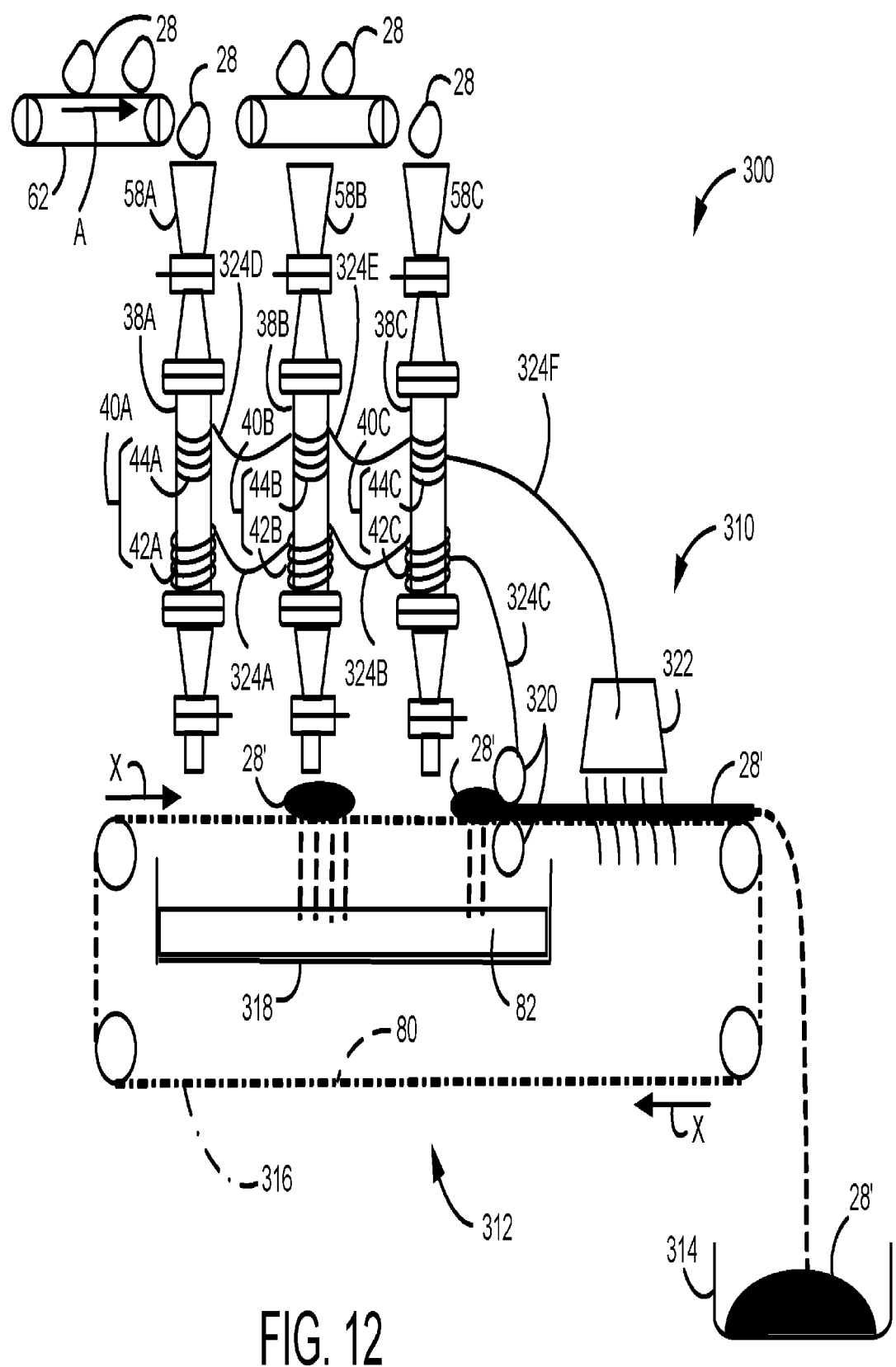
FIG. 12 illustrates a schematic diagram of yet another exemplary waste treatment system using three bundle reactors of FIG. 6 and a dehydration system in accordance with embodiments of the present disclosure.

Referring now to FIG. 12, yet another exemplary waste treatment system 300 using the plurality of the bundle reactors 38A-38C is shown in accordance with embodiments of the present disclosure. Although three bundle reactors 38A-38C are shown for illustration purposes, any number of bundle rectors can be implemented to suit the application.

In the illustrated embodiment, as shown in FIG. 8, the delivery system 62 is used to deliver the waste materials 28 into the respective hoppers 58A, 58B, 58C, and to serially advance the waste materials 28 in the flow direction designated by the arrow A. Also, as shown in FIG. 9, the plurality of the bundle reactors 38A-38C is used to share and recirculate the thermal energy between the bundle reactors to improve the energy efficiency during the waste treatment.

In this configuration, the first bundle reactor 38A is connected to the first energy recirculation assembly 40A, having the first heating unit 42A and the first cooling unit 44A. Similarly, the second bundle reactor 38B is connected to the second energy recirculation assembly 40B, having the second heating unit 42B and the second cooling unit 44B. The third bundle reactor 38C is connected to the third energy recirculation assembly 40C, having the third heating unit 42C and the third cooling unit 44C.

An important aspect of the waste treatment system 300 is an implementation of a dehydration and drying system 310 configured to perform the dehydrate process step and the dry process step for the treated waste materials 28' as a separate, independent system without using the respective holding tanks 60A-60C. In the illustrated embodiment, the dehydration and drying system 310 performs the dehydrate process step using a continuous delivery system 312, such as the conveyor device. Upon completion of the dehydrate and dry process steps, the delivery system 312 delivers the treated waste materials 28' into a collection tank 314 configured to receive the treated waste materials 28'.

A delivery belt 316 having the mesh filter 80 is included in the delivery system 312 and configured to receive the treated waste materials 28' from the respective first, second, and third bundle reactors 38A, 38B, 38C for delivery. In one embodiment, the treated waste materials 28' received from the bundle reactors 38A, 38B, 38C are dehydrated on the delivery belt 316 while moving in flow directions designated by arrows X. During the dehydrate process step, the liquids 82 filtered out of the treated waste materials 28' are collected in a liquid container 318 under the action of gravity.

In one embodiment, the dehydration and drying system 310 performs the dry process step using a first drying apparatus 320 and a second drying apparatus 322. As a first stage of the dry process step, the first drying apparatus 320, such as a pair of heat rollers, configured to press the treated waste materials 28' is used for extracting additional liquids 82.

During the dry process step, the first drying apparatus 320 is heated by the thermal energy associated with at least one of: the first, second, and third bundle reactors 38A, 38B, 38C. In the illustrated embodiment, a first energy transfer medium 324A is used to achieve the thermal energy recirculation and configured to allow the thermal energy associated with the first heating unit 42A to be transferred to the second heating unit 42B.

In turn, the thermal energy associated with the second heating unit 42B is transferred to the third heating unit 42C via a second energy transfer medium 324B. Similarly, the thermal energy associated with the third heating unit 42C is transferred to the first drying apparatus 320 via a third energy transfer medium 324C. Thus, as the treated waste materials 28' is pressed or squeezed by the first drying apparatus 320, the total liquid content in the treated waste materials 28' is further reduced due to the transferred thermal energy.

As a second stage of the dry process step, the second drying apparatus 322, such as a wind outlet blowing hot air, configured to heat the treated waste materials 28' is used for extracting or drying additional liquids 82 from the treated waste materials 28'. During the dry process step, the second drying apparatus 322 is heated by the thermal energy associated with at least one of: the first, second, and third bundle reactors 38A, 38B, 38C.

In the illustrated embodiment, a fourth energy transfer medium 324D is used to achieve the thermal energy recirculation and configured to allow the thermal energy associated with the first cooling unit 44A to be transferred to the second cooling unit 44B. In turn, the thermal energy associated with the second cooling unit 44B is transferred to the third cooling unit 44C via a fifth energy transfer medium 324E.

Similarly, the thermal energy associated with the third cooling unit 44C is transferred to the second drying apparatus 322 via a sixth energy transfer medium 324F. Thus, as the treated waste materials 28' is heated by the second drying apparatus 322, the total liquid content in the treated waste materials 28' is further reduced due to the transferred thermal energy. As a result, the treated waste materials 28' is energy efficiently dried to produce the sterilized coal-like product, such as hydrochar or biochar.

Figure 13:
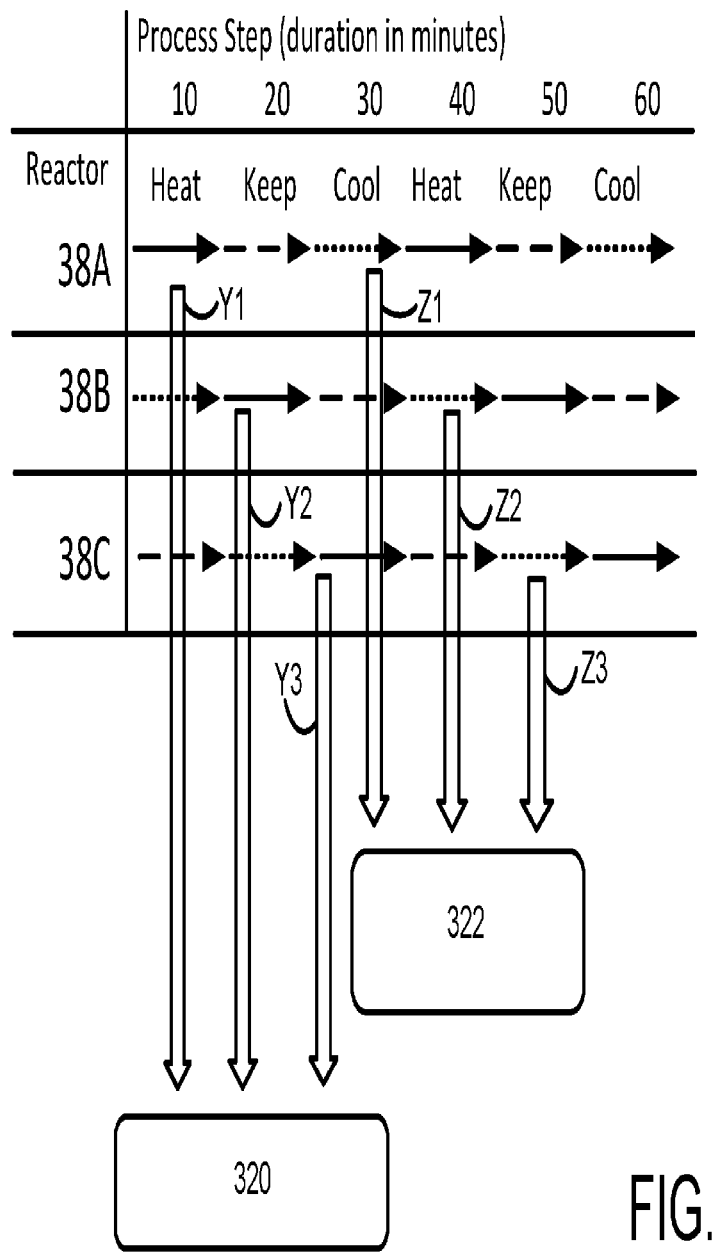
FIG. 13 illustrates an exemplary graphical presentation of a relationship between each of the bundle reactors of the waste treatment system of FIG. 12 and an exemplary waste treatment process step associated with each bundle reactor during the waste treatment.

Referring now to FIG. 13, an exemplary relationship is shown between each of the bundle reactors 38A, 38B, 38C of the waste treatment system 300 and the waste treatment process steps associated with each bundle reactor during the waste treatment. An exemplary duration of each process step of the waste treatment is approximately 10 minutes.

In this arrangement, initially, the first bundle reactor 38A is performing the heat process step, the second bundle reactor 38B is performing the cool process step, and the third bundle reactor 38C is performing the keep process step. Other suitable initial process steps are also contemplated to suit the application.

As designated by an arrow Y1, the thermal energy associated with the first heating unit 42A of the first bundle reactor 38A in the heat process step is applied to the treated waste materials 28' at the first stage of the dry process step using the first drying apparatus 320. As designated by an arrow Y2, the thermal energy associated with the second heating unit 42B of the second bundle reactor 38B in the heat process step is applied to the treated waste materials 28' at the first stage of the dry process step using the first drying apparatus 320. In a similar manner, an arrow Y3 represents the thermal energy recirculation techniques that can be implemented between the third bundle reactor 38C and the first drying apparatus 320.

As designated by an arrow Z1, the thermal energy associated with the first bundle reactor 38A in the cool process step is applied to the treated waste materials 28' at the second stage of the dry process step using the second drying apparatus 322. As designated by an arrow Z2, the thermal energy associated with the second bundle reactor 38B in the cool process step is applied to the treated waste materials 28' at the second stage of the dry process step using the second drying apparatus 322. In a similar manner, an arrow Z3 represents the thermal energy recirculation techniques that can be implemented between the third bundle reactor 38C and the second drying apparatus 322.

As such, it is advantageous that the plurality of the bundle reactors 38A-38C are configured to share and recirculate the thermal energy between the bundle reactors and relevant drying apparatuses 320, 322 of the waste treatment system 300. In the illustrated embodiment, the improvements in energy efficiency are achieved during the dehydrate process step and the dry process step of the waste treatment.

It should be appreciated that any steps of the waste treatment described herein may be implemented by a process controller, or other similar component, of the control system 68. Specifically, the process controller may be configured to execute computer readable instructions for performing one or more steps of the waste treatment. In one embodiment, the process controller may also be configured to transition from an operating state, during which a larger number of operations are performed, to a sleep state, in which a limited number of operations are performed.

Figure 14:
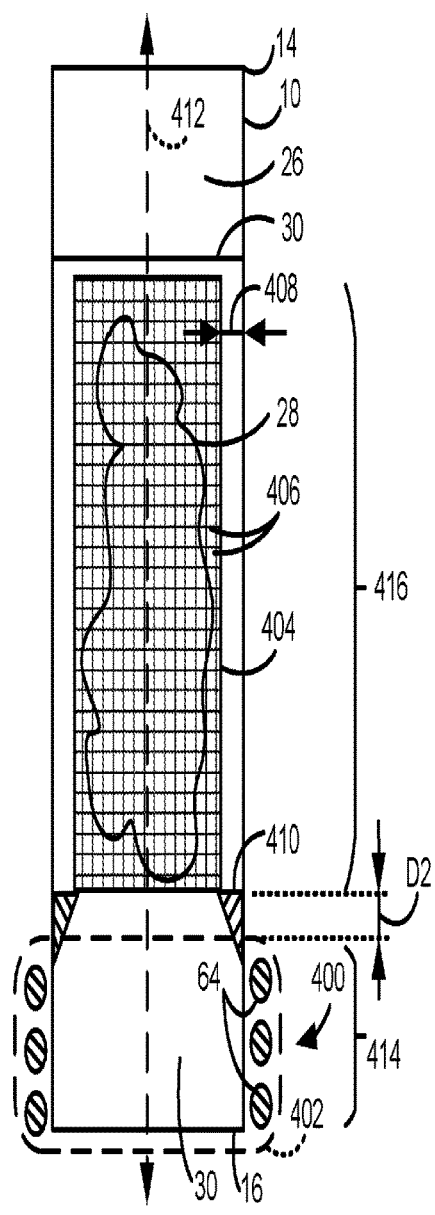
FIG. 14 illustrates a side crossection detail of the waste treatment reactor having a heating member configured to heat a first heating region of the waste treatment reactor in accordance with embodiments of the present disclosure.

Referring now to FIG. 14, in this embodiment, the waste treatment reactor 10 includes a heating member 400 configured to heat a first heating region 402 of the waste treatment reactor 10. In one embodiment, the first heating region 402 is inductively heated by the heating member 400 configured to surround an outer surface of the first heating region 402 of the waste treatment reactor 10. In one embodiment, the heating member 400 includes one or more heating induction coils 64 configured to surround at least a portion (e.g., a lower region) of the waste treatment reactor 10, and connected to the high-frequency power supply unit 66 (FIG. 8) configured to inductively drive the heating induction coils 64.

In one embodiment, the waste treatment reactor 10 includes a holding member 404 having a plurality of apertures 406, which is configured to hold or store the waste materials 28 in the holding member 404. During the waste treatment, the holding member 404 holding the waste materials 28 is inserted into and disposed in the waste chamber 26 of the waste treatment reactor 10. When inserted, an outer surface of the holding member 404 and an inner surface of the waste chamber 26 are longitudinally spaced apart from each other. As such, a gap 408 is created between the outer surface of the holding member 404 and the inner surface of the waste chamber 26 of the waste treatment reactor 10 for facilitating a free flow of the aqueous solution 30 in the waste treatment reactor 10.

In one embodiment, the holding member 404 is made of a metallic wire mesh, lattice, or screen, and fully submerged into the aqueous solution 30 such that the aqueous solution 30 permeates through the plurality of apertures 406, and is freely movable within the holding member 404 via the gap 408. For example, during the waste treatment, the heating member 400 inductively heats the aqueous solution 30 in the first heating region 402, and the heated aqueous solution 30 flows upwardly via the gap 408 and/or the apertures 406 toward and through the holding member 404 to heat the waste materials 28. As such, the heat from the aqueous solution 30 is effectively circulated in the waste chamber 26 and transferred between the first end 14 and the second end 16 of the waste treatment reactor 10 during the waste treatment.

A supporting member 410 is also included in the waste treatment reactor 10 and is configured to support the holding member 404 in the waste chamber 26 of the waste treatment reactor 10 during the waste treatment. In one embodiment, the supporting member 410 is a protrusion extending from the inner surface of the waste chamber 26 inwardly toward a central axis 412 of the waste chamber 26 of the waste treatment reactor 10. Other suitable configurations, such as a fin or ridge, of the supporting member 410 are also contemplated to suit the application.

An important aspect of the supporting member 410 is that the supporting member 410 is configured to dispose the holding member 404 to be separated or spaced apart from the heating member 400 at a predetermined distance D2. In one embodiment, the predetermined distance D2 is a longitudinal distance between the holding member 404 and the heating member 400 when viewed along the central axis 412 of the waste chamber 26 of the waste treatment reactor 10. In one embodiment, an exemplary predetermined distance D2 is greater than zero millimeters. In another embodiment, an exemplary predetermined distance D2 can be zero such that the holding member 404 and the heating member 400 are longitudinally abutted with each other to provide a continuous and seamless formation.

As shown in FIG. 14, the holding member 404 is positioned longitudinally spaced apart from the first heating region 402 of the waste treatment reactor 10. In one embodiment, the heating member 400 is disposed in a first or lower region 414 of the waste treatment reactor 10, and the holding member 404 is disposed in a second or upper region 416 of the waste treatment reactor 10. As such, the first region 414 and the second region 416 are separated in different locations of the waste treatment reactor 10.

In FIG. 14, an enhanced thermal convection heat transfer is provided when the holding member 404 is disposed longitudinally separately from the heating member 400 separating (i.e., without overlapping) the first region 414 and the second region 416 of the waste treatment reactor 10. A conventional reactor typically includes a heating unit configured to directly heat the waste materials in the reactor without separating (i.e., overlapping) the first region 414 and the second region 416 of the waste treatment reactor 10. In this case, since the waste materials are positioned directly under the heating unit, an undesired heat insulation effect occurs during the waste treatment causing an inadequate thermal convection heat transfer from the aqueous solution 30 to the waste materials 28.

In contrast, as shown in this embodiment of FIG. 14, the first region 414 is disposed in the lower region of the waste treatment reactor 10, and the second region 416 is disposed in the upper region of the waste treatment reactor 10, without creating any overlapped region between the first region 414 and the second region 416. In this configuration, it is advantageous that separating the first region 414 and the second region 416 causes the aqueous solution 30 to receive the heat generated by the heating member 400 without having the undesired heat insulation effect.

Consequently, a temperature measured in the first region 414 of the waste chamber 26 of the waste treatment reactor 10 is approximately equal to a temperature measured at the outer surface of the first heating region 402 surrounded by the heating member 400. As such, it is beneficial that an improved homogeneous and efficient heating can be performed by the heating member 400, and further an enhanced temperature control of the waste materials 28 can also be achieved in the waste chamber 26 of the waste treatment reactor 10.

Figure 15:
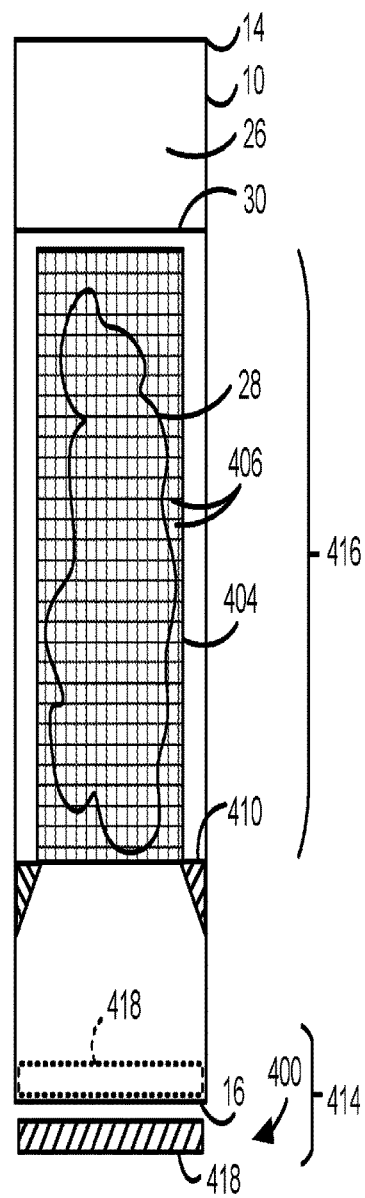
FIG. 15 illustrates a side crossection detail of another embodiment of the waste treatment reactor of FIG. 14 featuring a different configuration of the heating member configured to heat a different region of the waste treatment reactor.

Referring now to FIG. 15, in this embodiment, in lieu of the heating induction coils 64 shown in FIG. 14, a pancake-type coil 418 is included in the heating member 400 and configured to heat the first region 414 of the waste treatment reactor 10. Other suitable types of heating coils, such as water-cooled copper conductor coils made of copper tubing, are also contemplated to suit different applications.

In one embodiment, the pancake-type coil 418 is disposed outside of the waste chamber 26 near an outer surface of the second end 16 of the waste treatment reactor 10. In another embodiment, the pancake-type coil 418 is disposed inside of the waste chamber 26 near an inner surface of the second end 16 of the waste treatment reactor 10. In yet another embodiment, the pancake-type coil 418 can be disposed both inside and outside of the waste chamber 26 near the second end 16 of the waste treatment reactor 10.

Figure 16:
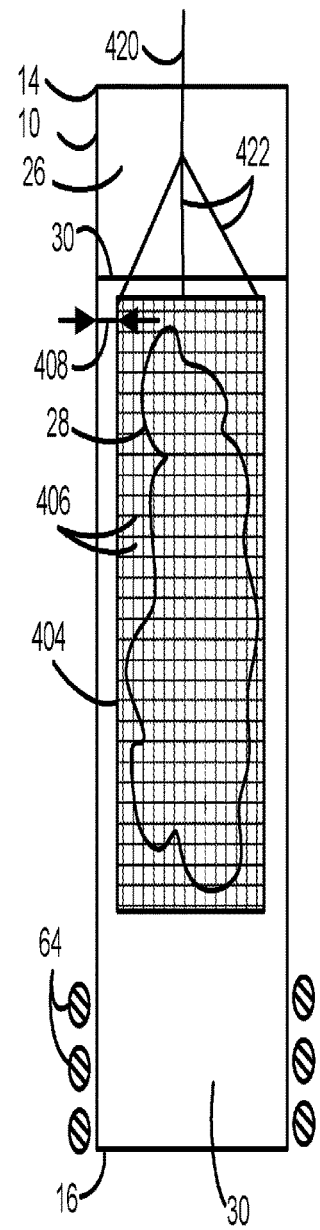
FIG. 16 illustrates a side crossection detail of yet another embodiment of the waste treatment reactor of FIG. 14 featuring a support member configured to support a holding member having the waste materials in the waste treatment reactor.

Referring now to FIG. 16, in this embodiment, in lieu of the supporting member 410 shown in FIG. 14, a hanging supporting member 420 is configured to allow the holding member 404 to be suspended in the waste chamber 26 of the waste treatment reactor 10 during the waste treatment. In one embodiment, the hanging supporting member 420 includes a plurality of arms 422 configured to removably engage at least a portion of the holding member 404. For example, the arms 422 include a plurality of hooks configured to engage an upper portion of the holding member 404.

In this configuration, the holding member 404 is movably held in the waste chamber 26 from the first end 14 of the waste treatment reactor 10 by the hanging supporting member 420. Thus, the aqueous solution 30 is freely circulated in the waste chamber 26 via the gap 408 while the holding member 404 is movable by the free flow of the aqueous solution 30 in the waste chamber 26 of the waste treatment reactor 10. As a result, the hanging supporting member 420 further facilitates the free flow of the aqueous solution 30 through the plurality of apertures 406 to effectively heat the waste materials 28 in the holding member 404.

Figure 17:
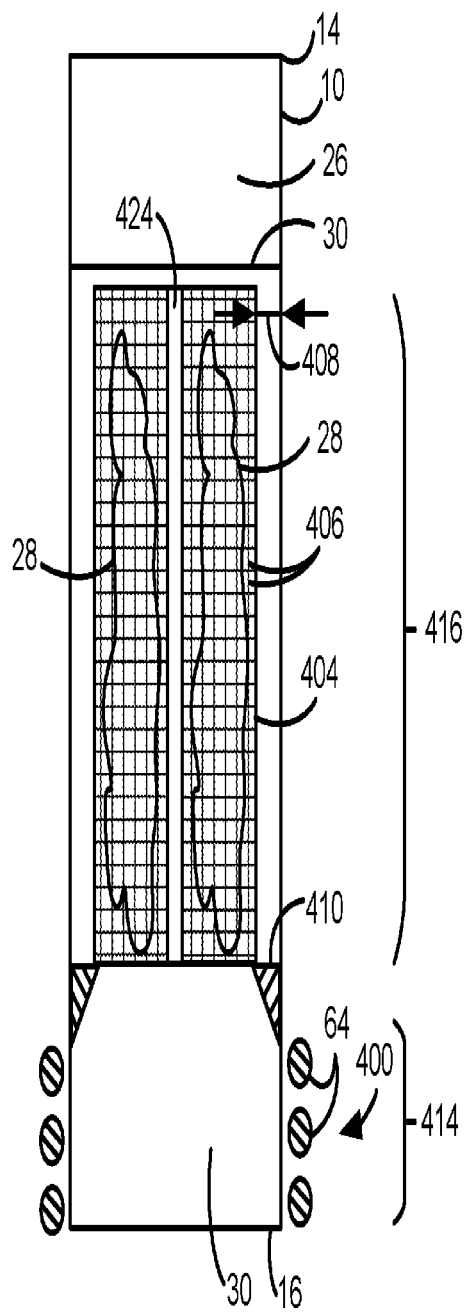
FIG. 17 illustrates a side crossection detail of still another embodiment of the waste treatment reactor of FIG. 14 featuring the holding member having a flow channel extending axially through the holding member.
Figure 18:
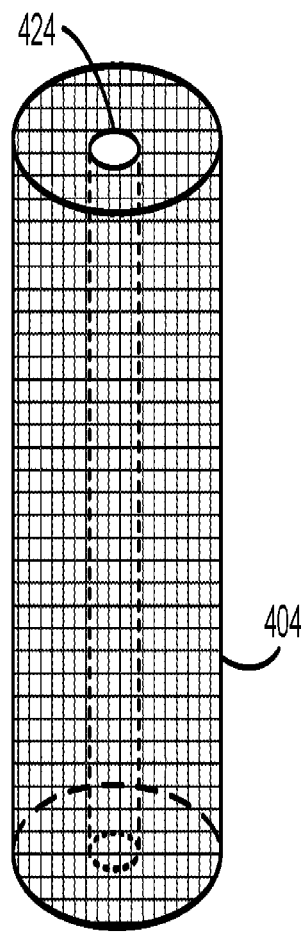
FIG. 18 illustrates a perspective view of the holding member having the flow channel shown in FIG. 17.

Referring now to FIGS. 17 and 18, in this embodiment, the holding member 404 includes a flow channel 424 extending axially through the holding member 404 and is configured for facilitating the free flow of the aqueous solution 30 via the flow channel 424. Although one flow channel 424 is shown, a plurality of flow channels 424 can be included in the holding member 404 to suit different applications. Other suitable types of channels, such as diagonal or irregularly shaped tunnels, are also contemplated. In this configuration, the aqueous solution 30 is freely circulated in the waste chamber 26 via the flow channel 424 between the first end 14 and the second end 16 of the waste treatment reactor 10. Thus, the heat is effectively transferred throughout the waste materials 28 in the holding member 404.

Referring now to FIGS. 14 and 19, the waste materials 28 can be heated by the free flow of the aqueous solution 30 in the waste chamber 26 of the waste treatment reactor 10. In embodiments, the free flow of the aqueous solution 30 includes at least one of: a volumetric fluid flow and a volumetric steam flow of the aqueous solution 30, both of which are generated by the heating member 400.

In one embodiment, as shown in FIG. 14, the waste materials 28 are heated by the volumetric fluid flow of the aqueous solution 30 that is generated by the heating member 400. In another embodiment, as shown in FIG. 19, the waste materials 28 are heated by the volumetric steam flow of the aqueous solution 30 that is generated by the heating member 400.

More specifically, in FIG. 19, the waste materials 28 in the holding member 404 are not fully submerged into the aqueous solution 30. In this configuration, the holding member 404 is separated or spaced apart from the aqueous solution 30 at a predetermined distance D3 by the supporting member 410 such that a volumetric steam flow designated by an arrow 426 is used to heat the waste materials 28 in the holding member 404.

In one embodiment, an exemplary temperature of the steam flow 426 is approximately 280° C. and an exemplary temperature of the aqueous solution 30 is also approximately 280° C. In this configuration, the waste treatment reactor 10 operates as the reactor vessel (e.g., the heat pipe) configured to effectively transfer heat between the first end 14 and the second end 16 of the waste treatment reactor 10 during the waste treatment.

Referring now to FIG. 20, in this embodiment, the waste treatment reactor 10 is configured to be utilized with a supplementary heating member 428 configured to heat a second heating region 430 of the waste treatment reactor 10. In one embodiment, the second heating region 430 is inductively heated by the supplementary heating member 428 configured to surround the outer surface of the second heating region 430 of the waste treatment reactor 10. In one embodiment, the supplementary heating member 428 includes one or more heating induction coils 64 configured to surround at least a portion (e.g., an upper region) of the waste treatment reactor 10, and connected to the high-frequency power supply unit 66 (FIG. 8) configured to inductively drive the heating induction coils 64.

In FIG. 20, the waste materials 28 in the holding member 404 is also not fully submerged into the aqueous solution 30. In this configuration, the second heating region 430 is separated or spaced apart from the first heating region 402 by the supporting member 410 such that the steam flow designated by the arrows 426, 426' is used to heat the waste materials 28 in the holding member 404. However, in this embodiment, the steam flow 426' in the second heating region 430 is further heated by the supplementary heating member 428. In certain embodiments, a super-heated steam refers to the steam flow 426' in the second heating region 430.

In one embodiment, the heating member 400 is configured to heat the first heating region 402 of the waste treatment reactor 10 to reach a first predetermined temperature $T_1$, and the supplementary heating member 428 is configured to heat the second heating region 430 of the waste treatment reactor 10 to reach a second predetermined temperature $T_2$. In one embodiment, the second predetermined temperature $T_2$ is higher than the first predetermined temperature $T_1$.

In one embodiment, an exemplary second predetermined temperature $T_2$ of the steam flow 426' in the second heating region 430 ranges approximately between 400° C. and 500° C., and an exemplary first predetermined temperature $T_1$ of the stream flow 426 and the aqueous solution 30 in the first heating region 402 is approximately 280° C. In this configuration, the waste treatment reactor 10 operates as the reactor vessel (e.g., the heat pipe) configured to effectively transfer heat between the first end 14 and the second end 16 of the waste treatment reactor 10 during the waste treatment.

Referring now to FIGS. 19 and 20, the waste treatment reactor 10 is configured to heat the waste materials 28 using at least one of: the volumetric steam flow and the volumetric fluid flow in the waste treatment reactor 10. More specifically, in FIG. 20, the waste treatment reactor 10 is configured to heat the waste materials 28 in the holding member 404 using one or more steam flows 426 and 426' for treating the waste materials 28.

However, in FIG. 19, the waste treatment reactor 10 is also configured to heat the waste materials 28 using the aqueous solution 30' by at least partially or fully submerging the waste materials 28 into the aqueous solution 30'. In this configuration, the aqueous solution 30' permeates through the plurality of apertures 406 to heat the waste materials 28 in the holding member 404. As such, the waste treatment reactor 10 is configured to heat the waste materials 28 using at least one of: the volumetric steam flow of the aqueous solution 30 and the volumetric fluid flow of the aqueous solution 30'.

Figure 21:
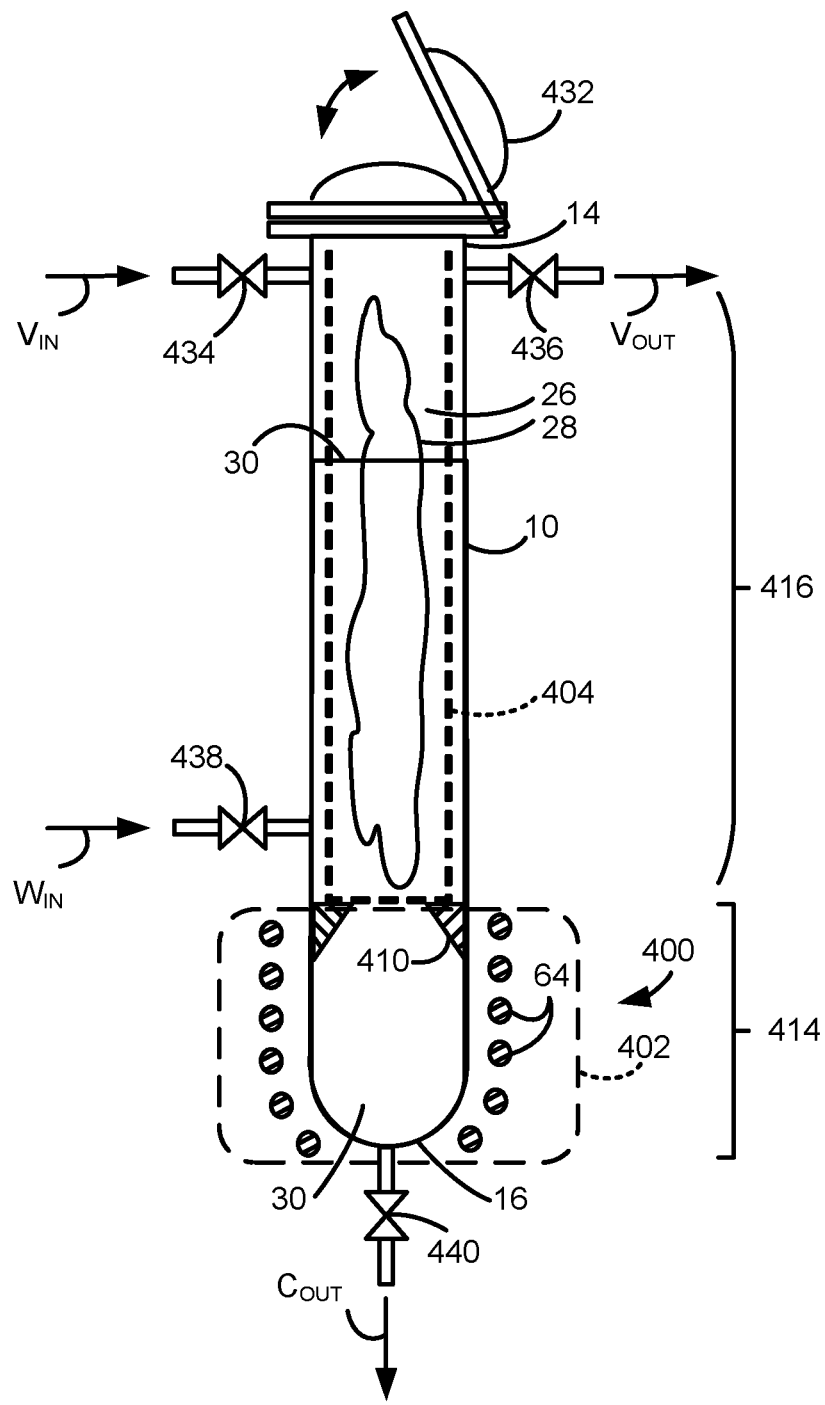
FIG. 21 illustrates a schematic diagram of yet another configuration of the waste treatment reactor of FIG. 14 featuring inlet and outlet valves in accordance with embodiments of the present disclosure.

Referring now to FIG. 21, an exemplary system configuration of treating the waste materials 28 using the waste treatment reactor 10 is shown. In this embodiment, the waste treatment reactor 10 includes a lid 432 removably attached to the first end 14 of the waste treatment reactor 10. For example, the lid 432 can be a clutch door or a latch or flange mechanism. In one embodiment, the lid 432 is configured to maintain an appropriate inner pressure of the waste chamber 26 of the waste treatment reactor 10 during operation. An exemplary saturated vapor pressure in the waste chamber 26 when the aqueous solution 30 is at approximately 280° C. is approximately 6.5 megapascal (MPa).

In FIG. 21, the heating member 400 having the heating induction coils 64 inductively heats the first heating region 402 of the waste treatment reactor 10. In one embodiment, the temperature of the aqueous solution 30 in the first heating region 402 of the waste treatment reactor 10 is approximately 280° C., and the temperature near the outer surface of the first heating region 402 of the waste treatment reactor 10 is approximately 350° C.

When the waste materials 28 in the holding member 404 is heated in this state for a predetermined period (e.g., as shown in FIG. 3), certain waste materials, such as paper dusts, are carbonized and become a mud-like carbide material. During the waste treatment, the carbide material dissolves or disperses into the aqueous solution 30. Upon completion of dissolution of the carbide material, non-reactants, such as glass, metal, and the like, of the waste materials 28 remain in the holding member 404. When the lid 432 is opened, the non-reactants in the holding member 404 can be retrieved by pulling the holding member 404 upwardly from the waste treatment reactor 10.

In one embodiment, the waste treatment reactor 10 is fluidically connected to a vapor inlet valve 434 configured to receive a vapor designated by an arrow VIN, e.g., from another adjacent waste treatment reactor. In another embodiment, the waste treatment reactor 10 is fluidically connected to a vapor outlet valve 436 configured to expel a vapor designated by an arrow VOUT in the waste chamber 26 of the waste treatment reactor 10. In one embodiment, the vapor inlet valve 434 and the vapor outlet valve 436 are disposed near the first end 14 of the waste treatment reactor 10. Other suitable locations of the vapor inlet valve 434 and the vapor outlet valve 436 are also contemplated to suit the application.

In yet another embodiment, the waste treatment reactor 10 is fluidically connected to an aqueous solution inlet valve 438 configured to receive an aqueous solution designated by an arrow WIN. In one embodiment, the aqueous solution inlet valve 438 is disposed near the heating member 400 in the first region 414 of the waste treatment reactor 10. In one embodiment, the vapor inlet valve 434, the vapor outlet valve 436, and the aqueous solution inlet valve 438 are disposed in the second region 416 of the waste treatment reactor 10. Other suitable locations of the aqueous solution inlet valve 438 are also contemplated to suit the application.

In still another embodiment, the waste treatment reactor 10 is fluidically connected to an outlet valve 440 configured to expel or deliver the aqueous solution 30 having the carbide material designated by an arrow COUT from the waste treatment reactor 10. In one embodiment, the outlet valve 440 is disposed near the second end 16 of the waste treatment reactor 10. Other suitable locations of the outlet valve 440, such as a lateral side or a peripheral edge, are also contemplated to suit the application. In some embodiments, a pressure gauge, a safety check valve, and the like can also be connected to the waste treatment reactor 10 to suit different applications.

In one embodiment, the control system 68 (FIG. 8) commands or instructs relevant components of the waste treatment reactor 10 (e.g., the lid 432 and other valves 434, 436, 438, and 440) to appropriately actuate corresponding components, such that an appropriate inner pressure and/or an appropriate amount of aqueous solution can be maintained during operation. Other suitable automated operations associated with the waste treatment reactor 10 are also achieved by the control system 68.

Figure 22:
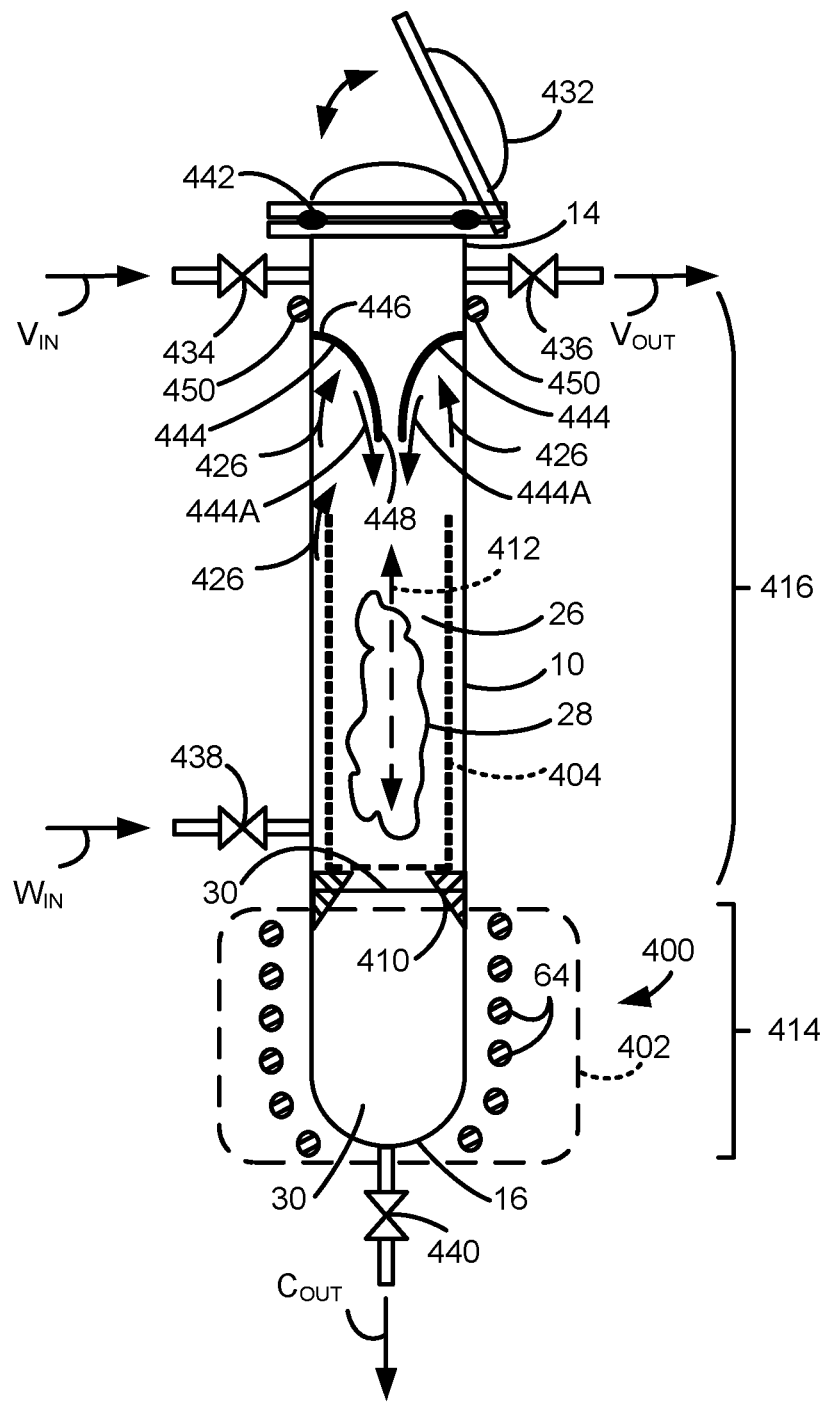
FIG. 22 illustrates a schematic diagram of still another configuration of the waste treatment reactor of FIG. 19 featuring a condensate insertion member in accordance with embodiments of the present disclosure.

Referring now to FIG. 22, another exemplary system configuration of treating the waste materials 28 using the waste treatment reactor 10 is shown. In this embodiment, the waste treatment reactor 10 includes the lid 432 removably attached to the first end 14 of the waste treatment reactor 10 for securely maintaining the appropriate inner pressure of the waste chamber 26 during operation. An exemplary saturated vapor pressure in the waste chamber 26 when the aqueous solution 30 is at approximately 270° C. is approximately 6 megapascal (MPa).

Included in the lid 432 is a seal ring 442 configured to provide tight sealing against the first end 14 of the waste treatment reactor 10 for securely maintaining the saturated vapor pressure in the waste chamber 26 when the lid 432 is closed. Other suitable sealing arrangements, such as an O-shaped ring or a circumferential or radial protrusion extending from the lid 432, are also contemplated to suit different applications.

In certain embodiments, the waste treatment reactor 10 includes a condensate insertion member 444 configured to generate condensate in the waste chamber 26 near the first end 14 and insert the condensate into the waste materials 28 in the holding member 404 to heat a predetermined portion of the waste materials 28. In one embodiment, the condensate insertion member 444 has a substantially funnel-shaped body defining a conduit extending downwardly in a direction from the first end 14 of the waste treatment reactor 10 to the second end 16 of the waste treatment reactor 10.

In one embodiment, the condensate insertion member 444 includes a first or upper end 446 having a first opening, and a second or lower end 448 having a second opening wherein the first opening is larger than the second opening. In another embodiment, the first opening at the first end 446 is gradually reduced toward the second opening at the second end 448 with respect to the central axis 412 of the waste chamber 26 of the waste treatment reactor 10. For example, the condensate insertion member 444 inwardly and downwardly extends from an inner surface of the waste chamber 26 of the waste treatment reactor 10 toward the central axis 412 in the direction from the first end 14 to the second end 16 of the waste treatment reactor 10.

Also included in the waste treatment reactor 10 is a cooling member 450 configured to cool at least a portion associated with the first end 14 of the waste treatment reactor 10. In one embodiment, the cooling member 450 is made of a continuous pipe configured to be touchingly engageable with or in direct contact with an outer surface of an upper portion of the waste treatment reactor 10. Any suitable cooling arrangements, such as water-cooled or air-cooled systems, are also contemplated to suit different applications.

In one embodiment, the cooling member 450 is configured to cool at least one of: the lid 432, the seal ring 442, and the condensate insertion member 444. In one example, the condensate insertion member 444 is cooled by the cooling member 450. In turn, the steam flow 426 is cooled by the condensate insertion member 444, thereby generating the condensate from the cooled steam. Using the funnel-shaped body configuration, the condensate insertion member 444 guides the condensate from the first end 446 to the second end 448. Then, the guided condensate is inserted into the waste materials 28 in the holding member 404.

In the illustrated embodiment, a condensate flow designated by arrows 444A is used to heat the waste materials 28 in the holding member 404. As described above, the condensate is generated when the steam flow 426 is in contact with the condensate insertion member 444 which is cooled by the cooling member 450.

Then, the condensate is guided from the first end 446 to the second end 448 aiming toward the predetermined portion, such as a central portion, of the waste materials 28 in the holding member 404. Under the action of gravity, the condensate is freely precipitated onto or forcibly inserted into the central portion of the waste materials 28 to specifically heat the central portion of the waste materials 28.

More specifically, the condensate is condensed steam associated with the steam flow 426 in the waste chamber 26 of the waste treatment reactor 10. In one embodiment, the steam flow 426 can heat an outer portion of the waste materials 28 and the condensate generated by the condensate insertion member 444 can heat an inner portion of the waste materials 28.

In this configuration, the outer portion and the inner portion of the waste materials 28 are substantially evenly heated at the same time. Also, the time allotted for heating the waste materials 28 is significantly reduced because both of the outer portion and the inner portion of the waste materials 28 are heated simultaneously. Moreover, due to this cooling effect near the first end 14 of the waste treatment reactor 10, a lifespan of the seal ring 442 is prolonged and a functional handling of the lid 432 becomes more manageable for operators.

The present disclosure is more easily comprehended by reference to the specific embodiments, examples and drawings recited hereinabove which are representative of the present disclosure. It must be understood, however, that the same are provided for the purpose of illustration, and that the present disclosure may be practiced otherwise than as specifically illustrated without departing from its spirit and scope. As will be realized, the present disclosure is capable of various other embodiments and that its several components and related details are capable of various alterations, all without departing from the basic concept of the present disclosure. Accordingly, descriptions will be regarded as illustrative in nature and not as restrictive in any form whatsoever. Modifications and variations of the system, method, and apparatus described herein will be obvious to those skilled in the art. Such modifications and variations are intended to come within the scope of the appended claims.

What is claimed is:

1. A reactor for treating one or more waste materials, comprising:
   a cylindrical body having a first end and an opposite second end, the first end configured to receive the waste materials for waste treatment, the second end configured to deliver treated waste materials from the cylindrical body, the cylindrical body having a predetermined length and diameter ratio to be operated as a heating member in the form of a heat pipe during the waste treatment;
   a condensate insertion member having a first upper end, and a second upper end projecting directly and laterally opposite the first upper end, both said first and second upper ends connected to an inner wall of the cylindrical body, and a first lower end, and a second lower end projecting directly and laterally opposite the first lower end, both said first and second lower ends extending toward but not crossing a central axis, the first upper end extending inwardly and downward towards the first lower end from the first end of the cylindrical body to the second end of the cylindrical body, and the second upper end extending inwardly and downward towards the second lower end from the first end of the cylindrical body to the second end of the cylindrical body, wherein the condensate insertion member is configured to generate condensate in the reactor and insert the condensate into the waste materials to heat a predetermined portion of the waste materials, and
   wherein the predetermined length and diameter ratio is defined by a longitudinal length of the cylindrical body and an outer diameter of the cylindrical body, and has a predetermined value defined by a lower boundary value and an upper boundary value.

2. The reactor of claim 1, wherein the reactor includes a heating member configured to heat a first heating region of the reactor.

3. The reactor of claim 2, wherein the waste materials are heated using at least one of: a volumetric steam flow and a volumetric fluid flow generated by the heating member.

4. The reactor of claim 2, wherein the reactor includes a holding member configured to hold the waste materials in the holding member.

5. The reactor of claim 4, wherein the reactor includes a supporting member configured to support the holding member in a waste chamber of the reactor during the waste treatment.

6. The reactor of claim 5, wherein the supporting member is configured to dispose the holding member to be separated from the heating member at a predetermined distance.

7. The reactor of claim 4, wherein the reactor includes a hanging supporting member configured to allow the holding member to be suspended in the reactor during the waste treatment.

8. The reactor of claim 4, wherein the holding member includes a flow channel configured for facilitating a flow of an aqueous solution in the reactor.

9. The reactor of claim 1, wherein the reactor includes a supplementary heating member configured to heat a second heating region of the reactor.

10. The reactor of claim 9, wherein the heating member is configured to heat a first heating region to reach a first predetermined temperature, and the supplementary heating member is configured to heat the second heating region to reach a second predetermined temperature.

11. The reactor of claim 1, wherein the reactor is configured to heat the waste materials using at least one of: a volumetric steam flow and a volumetric fluid flow generated in the cylindrical body.

* * * * *